2,845,427

TERTIARY-AMINO-SUBSTITUTED 1,5-IMINOCYCLOALKANES AND PREPARATION THEREOF

Sydney Archer, Albany, N. Y., assignor to Sterling Drug Inc., New York, N. Y., a corporation of Delaware No Drawing. Application January 24, 1955
Serial No. 483,808

19 Claims. (Cl. 260—292)

The inventive contribution herein described is the novel group of chemical compounds obtained by the attachment to a 1,5-imino N-substituted cycloalkane at the 3-position thereof, through an intervening polyvalent non-metallic atom, of a basic-tertiary-amino-alkylene group and the procedure whereby this is accomplished.

The cycloalkane above is preferably cycloheptane or cyclooctane and among the substituents on the nitrogen atom of the 1,5-imino bridge are hydrocarbon radicals or such radicals bearing substituents such as halo, alkyl, alkoxy, et cetera. The said radical preferably has from 1 to about 10 carbon atoms. The polyvalent non-metallic atom serving to connect the cycloalkane and the tertiary-amino-alkylene group is preferably nitrogen, oxygen, or sulfur. The basic-tertiary-amino-alkylene group is a nitrogen atom to which there is attached an alkylene radical and the other two valences are satisfied by two organic radicals which may be linked to form a ring including the tertiary-amino nitrogen atom.

A particular aspect of the invention relates to tertiary-amino-substituted tropanes and granatanines and salts thereof, said tropanes and granatanines having the general formula:

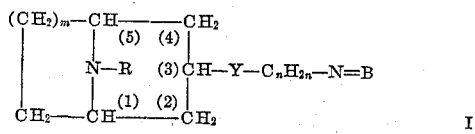

wherein Y is a divalent radical selected from the group consisting of NH, N(lower-alkyl), N(lower-alkanoyl), N(monocarbocyclic aroyl), N(lower - alkylcarbamyl), N(lower-alkenylcarbamyl), N(monocarbocyclic arylcarbamyl), N(lower-alkylthiocarbamyl), N(lower-alkenylthiocarbamyl) and N(monocarbocyclic arylthiocarbamyl), $n$ is an integer from 2 to 6, $m$ is an integer from 1 to 2, R is a member of the group consisting of lower-alkyl, monocarbocyclic aryl-lower-alkyl, and monocarbocyclic aryl, and N=B is a tertiary-amino group selected from the class consisting of di-lower-alkylamino, 1-piperidyl, 1-pyrrolidyl, 4-morpholinyl, monocarbocyclic aryl-lower-alkylamino, and groups having the structure:

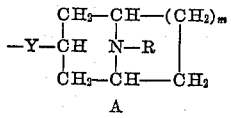

A

The invention also relates to methods for preparing said new tertiary-amino-substituted tropanes and granatanines.

Another aspect of the invention relates to substituted tropanes and granatanines and their salts, said substituted tropanes and granatanines having the general formula:

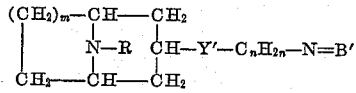

II wherein Y' is a divalent atom selected from the class consisting of O and S, —N=B' is selected from the group consisting of di-lower-alkylamino, 1-piperidyl, 1-pyrrolidyl, 4-morpholinyl, and monocarbocyclic aryl-lower-alkylamino, and the remaining groups have the same meanings as given above.

Pharmacological evaluation of the compounds of the invention by the standard carotid occlusion response in dogs and the nictitating membrane response in cats has shown that these substances have ganglionic blocking effects and indicate usefulness for the compounds in the field of reducing hypertension. The quaternary ammonium salts are particularly potent ganglionic blocking agents, although the free bases and acid-addition salts also possess ganglionic blocking action but larger doses are required than for the quaternary ammonium salts.

In the above general Formulas I and II, the grouping $C_nH_{2n}$ represents a lower-alkylene radical in which the free valences are on different carbon atoms. In other words, the radicals N=B (or N=B') and Y (or Y') are attached to different carbon atoms of the alkylene bridge. The alkylene bridge $C_nH_{2n}$ must perforce contain at least two carbon atoms, and can contain as many as about six carbon atoms. The lower-alkylene radicals are straight or branched and include such radicals as ethylene, —CH$_2$CH$_2$—; 1,3-propylene, —CH$_2$CH$_2$CH$_2$—; 1,2-propylene, —CH(CH$_3$)CH$_2$—; 1,4-butylene,

1,5-pentylene, —CH$_2$CH$_2$CH$_2$CH$_2$CH$_2$—; 1,6-hexylene, —CH$_2$CH$_2$CH$_2$CH$_2$CH$_2$CH$_2$—; 1,2 - dimethylethylene, —CH$_2$(CH$_3$)CH(CH$_3$)—; and the like. A preferred subgroup of compounds are those in which $n$ is equal to 2, so that the lower-alkylene radical $C_nH_{2n}$ is an ethylene (—CH$_2$CH$_2$—) group.

In the above general Formulas I and II, the tertiary-amino radical N=B or N=B' includes di-lower-alkylamino, saturated N-heterocyclic groups, such as 1-piperidyl, 1-pyrrolidyl, 4-morpholinyl, and lower-alkylated derivatives thereof (for example, 2-methyl-1-piperidyl, 3-ethyl-1-pyrrolidyl, 3-methyl-4-morpholinyl, and the like), and lower-alkyl-arylamino groups wherein the aryl group is a monocarbocyclic aryl group. The term lower-alkyl includes alkyl radicals containing from one to about six carbon atoms, and in the di-loweral-alkylamino radicals the lower-alkyl groups can be the same or different. Thus N=B or N=B', when it represents a di-lower-alkylamino radical, includes such groups as dimethylamino, diethylamino, ethylmethylamino, dipropylamino, dibutylamino, dipentylamino and dihexylamino.

The term monocarbocyclic aryl refers to a radical of the benzene series and includes such groups as phenyl and phenyl substituted by inert substituents such as lower-alkyl, lower-alkoxy and halogen. Thus N=B or N=B', when it represents a lower-alkyl-arylamino group, includes such groups as methylphenylamino, $$N(CH_3)(C_6H_5)$$

ethylphenylamino, N(C$_2$H$_5$)(C$_6$H$_5$); methyl - 4 - chlorophenylamino, N(CH$_3$)(C$_6$H$_4$Cl—4); methyl-3-methoxyphenylamino, N(CH$_3$)(C$_6$H$_4$OCH$_3$—3); methyl-2-methylphenylamino, N(CH$_3$)(C$_6$H$_4$CH$_3$—2); isopropylphenylamino, N(C$_3$H$_7$)(C$_6$H$_5$); butylphenylamino, $$N(C_4H_9)(C_6H_5)$$

hexylphenylamino, N(C$_6$H$_{13}$)(C$_6$H$_5$); and the like. In the preferred types of lower-alkyl-arylamino groups, the lower-alkyl groups have from one to about six carbon atoms, and the aryl group is unsubstituted phenyl or phenyl substituted by from one to three lower-alkyl, lower-alkoxy, or halogen radicals, in which the lower-alkyl and lower-alkoxy radicals have from one to about six carbon atoms, and halogen is selected from fluorine, chlorine, bromine and iodine. The term lower-alkoxy is also intended to include the methylenedioxy group, —OCH$_2$O—, which, although divalent, can be readily classed with the monovalent alkoxy groups on the basis of its chemical properties. If more than one substituent is present in the phenyl ring they can be the same or different.

In compounds of Formula I, N=B can also represent a radical of Formula A. The preferred types of compounds where N=B has formula A are symmetrical compounds in which the moiety A is the same as the corresponding portion in Formula I.

In the above general Formula I, Y represents NH, N(lower-alkyl) or N(acyl). When Y is N(lower-alkyl), the lower-alkyl groups contain from one to about six carbon atoms and can be straight or branched. The N(acyl) groups are amido groups derived from carboxylic acids, preferably lower-alkanoic acids, monocyclic aromatic carboxylic acids, and carbamic and thiocarbamic acids of the type R'NHCOOH and R'NHCSOH, where R' is lower-alkenyl, lower-alkyl or monocarbocyclic aryl. The lower-alkyl and lower-alkenyl groups have from one to about six carbon atoms and can be straight or branched. The monocarbocyclic aryl groups are of the same type as those defined above. Thus, in compounds where Y is N(acyl), the acyl group stands for such radicals as lower-alkanoyl, for example, formyl, acetyl, propionyl, valeryl, isovaleryl, caproyl, isocaproyl and the like; monocarbocyclic aroyl, for example, benzoyl, p-toluyl, p-chlorobenzoyl, p-nitrobenzoyl, m-methoxybenzoyl and the like; lower-alkylcarbamyl, for example, methylcarbamyl, ethylcarbamyl, propylcarbamyl, isopropylcarbamyl, butylcarbamyl, pentylcarbamyl, hexylcarbamyl and the like; lower-alkenylcarbamyl, for example, vinylcarbamyl, allylcarbamyl, 3-butenylcarbamyl and the like; monocarbocyclic arylcarbamyl, for example, phenylcarbamyl, p-tolylcarbamyl, p-chlorophenylcarbamyl, m-methoxyphenylcarbamyl, 3,4-methylenedioxyphenylcarbamyl and the like; lower-alkylthiocarbamyl, for example, methylthiocarbamyl, ethylthiocarbamyl, propylthiocarbamyl, isopropylthiocarbamyl, butylthiocarbamyl, pentylthiocarbamyl, hexylthiocarbamyl and the like; lower-alkenylthiocarbamyl, for example, vinylthiocarbamyl, allylthiocarbamyl, 3-butenylthiocarbamyl and the like; and monocarbocyclic arylthiocarbamyl, for example, phenylthiocarbamyl, p-tolylthiocarbamyl, p-chlorophenylthiocarbamyl, 3,4-methylenedioxyphenylthiocarbamyl and the like.

In the above general Formulas I and II, R represents a lower-alkyl, aralkyl or monocarbocyclic aryl group. The lower-alkyl groups can be straight or branched and contain from one to about six carbon atoms. The aralkyl groups are monocarbocyclic aryl-lower-alkyl groups in which the monocarbocyclic aryl groups are the same type as described above. Accordingly R represents such groups as methyl, ethyl, propyl, isopropyl, butyl, isobutyl, tertiary-butyl, pentyl, hexyl, benzyl, 2-phenylethyl, 3-phenylpropyl, p-chlorobenzyl, m-methoxybenzyl, p-methylbenzyl, phenyl, o-bromophenyl, p-ethoxyphenyl, p-tolyl and the like.

Referring to the above general Formulas I and II, the compounds where $m$ is 1 belong to the tropane series whereas the compounds where $m$ is 2 belong to the granatanine series. In these compounds there is a possibility of stereoisomerism depending upon whether the side chain, —Y—C$_n$H$_{2n}$—N=B (or —Y'—C$_n$H$_{2n}$—N=B') is on the same side or the opposite side of the molecule as the substituent R. In the tropane series these stereoisomers are known as tropanes and pseudotropanes, respectively.

The 1,5-iminocycloalkanes of the invention wherein the tertiary-amino-lower-alkylene group is attached by NH to the 3-position are prepared by condensing a 1,5-iminocycloalkan-3-one having a hydrocarbon radical attached to the imino nitrogen with a tertiary-amino-lower-alkylamine, and reducing the resulting imine by catalytic hydrogenation or by chemical means, for example with sodium in the presence of a lower-alkanol.

The compounds of Formula I where Y is NH can be prepared by condensation of a compound having the formula

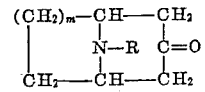
III with a tertiary-aminoalkylamine, H$_2$N—C$_n$H$_{2n}$—N=B, under catalytic hydrogenation conditions. The condensation and reduction take place at room temperature, although heat may be applied if desired. It is convenient to employ a liquid organic reduction medium, such as ethyl alcohol, which is unreactive with the compound III and tertiary-aminoalkylamine and is not subject to catalytic hydrogenation. Exemplary of the tertiary-aminoalkylamines which can be used are 2-diethylaminoethylamine, (C$_2$H$_5$)$_2$NCH$_2$CH$_2$NH$_2$; 3-dimethylaminopropylamine, (CH$_3$)$_2$NCH$_2$CH$_2$CH$_2$NH$_2$; 2-(1-piperidyl)propylamine, C$_5$H$_{10}$NCH(CH$_3$)CH$_2$NH$_2$; 5-(1-pyrrolidyl)pentylamine, C$_4$H$_8$NCH$_2$CH$_2$CH$_2$CH$_2$CH$_2$NH$_2$; 2-phenylmethylaminoethylamine, C$_6$H$_5$(CH$_3$)NCH$_2$CH$_2$NH$_2$; and the like.

The compounds of Formula III are readily prepared by the classic Robinson synthesis, i. e., condensation of succindialdehyde or glutaric dialdehyde with a primary amine and an acetone dicarboxylic acid ester, followed by hydrolysis and decarboxylation, according to the following equation:

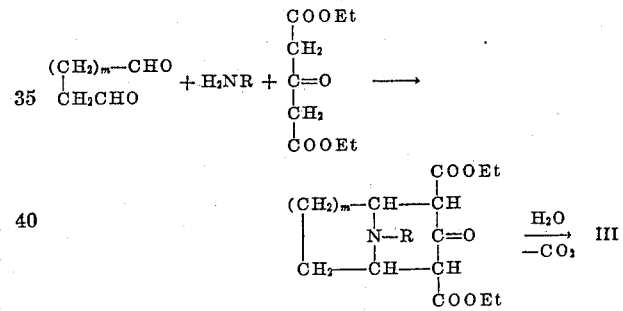

The succindialdehyde ($m=1$) is conveniently prepared in situ by acid treatment of 2,5-diethoxytetrahydrofuran. The glutaric dialdehyde is conveniently prepared in situ by heating glutaric dialdehyde dioxime with sodium nitrite in hydrochloric acid.

The compounds of Formula I where Y is NH can also be prepared by condensation of a compound of Formula III and H$_2$N—C$_n$H$_{2n}$—N=B in the presence of a dehydrating agent, such as zinc chloride, to give an unsaturated intermediate of the structure

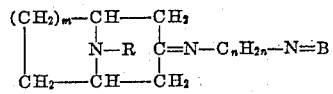
IV followed by reduction of the latter either catalytically or chemically, for example, by means of sodium in the presence of a lower-alkanol. Catalytic hydrogenation gives substantially exclusively one stereoisomer, belonging to or analogous to the normal tropane series. Sodium-alcohol reduction, however, usually yields a mixture of stereoisomers.

The compounds of Formula I where Y is an N(acyl) group are produced by acylation of the compounds where Y is NH by heating the latter with the appropriate acid, acid anhydride or acid halide. In the cases where the acyl group is a substituted carbamyl or thiocarbamyl radical, the secondary amine is reacted with the appropriate isocyanate or isothiocyanate. A particular advantage of the compounds where Y is N(substituted thiocarbamyl) lies in the fact that these particular derivatives permit ready separation of the stereoisomers produced by the sodium-alcohol reduction of compounds of Formula IV. The separation is accomplished by fractional crystallization from an appropriate solvent such as methanol or ethanol. The pure stereoisomers where Y is NH can then be obtained by hydrolysis of the thiocarbamyl derivatives.

The compounds of Formula I where Y is N(loweralkyl) are obtained by reduction of the compounds where Y is N(lower-alkanoyl) with lithium-aluminum hydride. The carbonyl group of the amide linkage is converted to a methylene group; thus a formyl group is reduced to a methyl group, an acetyl group to an ethyl group, and so forth.

An alternative method for preparing compounds of Formula I where Y is N(CH$_3$) comprises heating compounds where Y is NH with formaldehyde and formic acid. However, when a cycloalkane compound having a 1,5-imino bridge, a hydrocarbon radical attached to the imino nitrogen and a 2-(monocarbocyclic aryl-lower-alkylamino)ethylamino group attached to the 3-position of the cycloalkane ring is heated with formaldehyde and formic acid, instead of the corresponding compounds wherein the center nitrogen atom is methylated, there is obtained a cycloalkane compound having a 1,5-imino bridge, a hydrocarbon radical attached to the imino nitrogen and a 1-alkyl-1,2,4,5-tetrahydro-1,4-benzodiazepine radical attached to the 3-position of the cycloalkane ring through the nitrogen atom in the 4-position of the diazepine ring. These compounds are also within the purview of my invention. A particular aspect of the invention relates to compounds having the formula

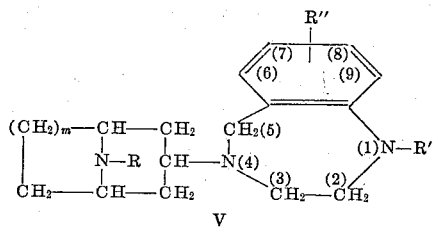

V

The compounds of Formula V are 1-alkyl-4-(3-tropanyl or -granatanyl)-1,2,4,5-tetrahydro-1,4-benzodiazepines, wherein m and R have the same meanings as given previously, R' represents a lower-alkyl group having from 1 to about 6 carbon atoms, and R" represents hydrogen or a lower-alkyl or lower-alkoxy group, said lower-alkyl or lower-alkoxy group having from 1 to about 6 carbon atoms. The compounds of Formula V are prepared by heating the compounds of Formula I wherein Y is NH, n is 2, and N=B is an aryl-lower-alkylamino group, wherein the aryl group is phenyl or phenyl substituted by lower-alkyl or lower-alkoxy groups, with formaldehyde and formic acid. Like the compounds of Formulas I and II, the compounds of Formula V are useful as ganglionic blocking agents.

The azepine structure was proved by Hofmann degradation studies. Hofmann degradation of the compound believed to be 1-methyl-4-(3-tropanyl)-1,2,4,5-tetrahydro-1,4-benzodiazepine [V; R'=CH$_3$, m=1, R=CH$_3$, R"=H] bismethiodide gave a product which formed a dipicrate and which gave carbon and hydrogen analytical values in agreement with 1-[(2-dimethylaminobenzyl)-vinylamino]-3-dimethylamino-5-cycloheptene having the structure

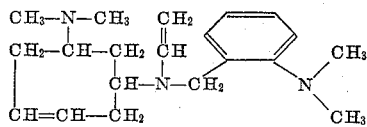

which would be expected from degradation of the azepine structure. If, on the other hand, the starting material were 3-[(2-phenylmethylaminoethyl)methylamino]tropane [I; Y = N(CH$_3$), n = 2, m = 1, R = CH$_3$, N=B=N(CH$_3$)(C$_6$H$_5$)] bismethiodide, the Hofmann degradation would give dimethylaniline and a compound of the structure

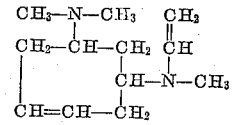

The latter structure would only form a monopicrate since vinyl amines do not readily form picrates. In view of the analytical data, and the facts that a dipicrate was obtained and no dimethylaniline could be detected, the azepine structure was established. Further evidence of the diazepine structure was obtained from the fact that analysis for N-methyl groups showed that the molecule contained two N-methyl groups whereas the open chain compound, 3 - [(2 - phenylmethylaminoethyl)methylamino]tropane, would contain three N-methyl groups.

The compounds of Formula I where N=B has the structure A above can be prepared by the methods described above but are more conveniently prepared by condensation of two equivalents of a compound of Formula III with an alkylendiamine (H$_2$N—C$_n$H$_{2n}$—NH$_2$) under catalytic hydrogenation conditions. The compound thus produced, a secondary amine where both Ys' are NH, can be acylated or alkylated as described above for converting compounds where Y is NH to compounds where Y is N(acyl) and N(lower-alkyl).

The 1,5-iminocycloalkanes of the invention wherein the tertiary-amino-lower-alkylene group is attached by oxygen or sulfur to the 3-position are prepared by reacting an alkali metal 1,5 - imino - 3 - cycloalkoxide or -alkylmercaptide having a hydrocarbon radical attached to the imino nitrogen with a tertiary-amino-lower-alkyl halide, or by reacting a 1,5-imino-3-cycloalkyl halide having a hydrocarbon radical attached to the imino nitrogen with an alkali metal tertiary-amino-lower-alkoxide or -alkylmercaptide.

The compounds of Formula II where Y' is O or S are prepared by reacting compounds having the formulas

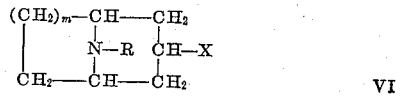

VI and

where one of X and X' is halogen, preferably chlorine, bromine or iodine, and the other of X and X' is OM or SM where M is an alkali metal. A preferred method where Y is O comprises heating a compound of Formula VI (X=OM) with a tertiary-aminoalkyl halide (X'—C$_n$H$_{2n}$—N=B'). The reaction is carried out by first preparing a suspension of VI (X=OM) in an inert organic liquid, such as toluene or xylene, then adding the tertiary-aminoalkyl halide and heating the mixture. Exemplary of the tertiary-aminoalkyl halides which can be used are 2-diethylaminoethyl chloride,

3-dimethylaminopropyl bromide,

2-dipropylaminopropyl chloride,

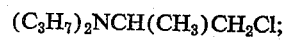

4-(1-piperidyl)butyl bromide,

5-(4-morpholinyl)pentyl chloride,

2-phenylmethylaminoethyl chloride,

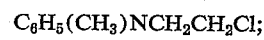

and the like.

The starting materials of Formula VI are readily prepared from the amino ketones of Formula III by reduction of the carbonyl group to a hydroxyl group and then converting the latter to the alkali metal derivative (X=OM) or replacing the hydroxyl group by halogen (X=halogen), or, if compounds where X=SM is desired, reacting the compound where X is halogen with sodium hydrosulfide (NaSH) and neutralizing the resulting mercaptan with an alkali metal hydroxide.

The new tertiary-amino-aliphatic substituted tropanes and granatanines of Formulas I, II and V are most conveniently used in the form of water-soluble, non-toxic acid-addition or quaternary ammonium salts. Non-toxic salts are salts whose anions are relatively innocuous to the animal organism in therapeutic doses of the salts, so that beneficial physiological properties inherent in the free bases are not vitiated by side effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, allyl chloride, allyl bromide, methyl sulfate, methyl benzenesulfonate methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution. The number of equivalents of acid which enter into salt formation depends upon the amount of acid present and the number of amino groups present in the free base. If an excess of acid is used, the number of equivalents of acid entering into salt formation will be equal to the number of basic nitrogens present in the free base.

The quaternary ammonium salts are prepared by mixing the free base and the alkyl, alkenyl or aralkyl esters in an organic solvent. Heating may be used to facilitate the reaction, although salt formation usually takes place readily at room temperature. The quaternary ammonium salt separates directly or can be obtained by concentration of the solution. The number of equivalents of alkyl halide or other ester entering into salt formation depends upon the amount of ester present relative to the amount of free base, and on the number of tertiary-amino groups present in the free base. The number of tertiary-amino groups present in the free base may vary from two, where Y (or Y') is O, S or NH, to four, where Y is N(lower-alkyl) and N=B has Formula A. If an excess of alkyl halide or other ester is used, some or all of the tertiary-amino groups present in the free base may be quaternized, depending upon reaction conditions such as time and temperature. In compounds of Formula I where Y is NH, N(acyl) or N(lower-alkyl) and where N=B is dialkyl-N(acyl) or N(lower-alkyl) and where N=B is dialkylamino, piperidyl, pyrrolidyl, morpholinyl or phenyl-lower-alkylamino, bis-quaternary salts are most often produced, probably involving the nitrogen atoms of the nucleus and N=B. In some cases, however, where Y is N(lower-alkyl) tris-quaternary salts are obtained, and mixtures of salts having different degrees of quaternization are sometimes produced.

The quaternary ammonium salts of my invention can be represented by the formula $Z \cdot (R'''X'')_{n'}$, wherein Z stands for an amine of Formulas I, II or V, R''' stands for a hydrocarbon radical, X'' stands for an anion, and $n'$ is an integer from 1 to 4 depending upon the number of quaternizable centers in the amine Z and the conditions under which the quaternization reaction takes place. Preferred types of the hydrocarbon group R''' are those having from one to about ten carbon atoms selected from lower-alkyl, lower-alkenyl and monocarbocyclic aryl-lower-alkyl groups in which the aryl groups can be substituted by inert substituents such as lower-alkyl, lower-alkoxy, halo and nitro.

The quaternary ammonium salts are prepared by reacting the amine Z with a compound R'''X'' where X'' is the anion of a strong acid. It is also possible to convert one quaternary ammonium salt to another in which the anion X'' is different. If the anion X'' of the quaternary salt forms a water-insoluble silver salt, the quaternary sale will react with silver oxide in aqueous medium to form the corresponding quaternary ammonium hydroxide. The latter can then be neutralized with any desired acid, weak or strong, to produce a new quaternary ammonium salt in which the anion is different from that of the original quaternary salt. In this way quaternary ammonium salts in which the anion X'' is derived from a weak acid can be obtained.

The following examples will further illustrate the invention.

*Example 1*

3-(2-diethylaminoethylamino)tropane [I; Y=NH, n=2, m=1, R=CH$_3$, N=B=N(C$_2$H$_5$)$_2$].—A mixture of 30 g. of 3-tropanone, 24 g. of 2-diethylaminoethylamine, 1.2 g. of platinum oxide catalyst and 50 ml. of ethyl alcohol was shaken in a hydrogen atmosphere at a pressure of 50 lbs. per sq. inch. After two and one-half hours one mole of hydrogen had been taken up, the reaction mixture was filtered, and the filtrate was concentrated and distilled, giving 33.2 g. of 3-(2-diethylaminoethylamino)-tropane, B. P. 111–115° C. (0.5 mm.).

*Analysis.*—Calcd. for C$_{14}$H$_{29}$N$_3$: N, 17.55. Found: N, 17.10.

A portion of the base was converted to the picrate by addition of an ethanol solution of the base to an ethanol solution of picric acid. The picrate which separated was collected by filtration and recrystallized from aqueous ethanol, giving a sample with the M. P. 163.5–166° C.

*Example 2*

3-(2-diethylaminoethyl)aminotropane trihydrochloride monohydrate.—An excess of alcoholic hydrogen chloride was added to a solution of 3-(2-diethylaminoethyl)aminotropane in ethanol. The crystalline product which separated was recrystallized first from 95% ethanol and then from methanol, giving 3-(2-diethylaminoethyl)aminotropane trihydrochloride monohydrate, M. P. 267–271° C.

*Analysis.*—Calcd. for C$_{14}$H$_{29}$N$_3 \cdot$3HCl$\cdot$H$_2$O: N, 11.46; Cl, 29.00; C, 45.83; H, 9.34. Found: N, 11.94; Cl, 28.85; C, 45.80; H, 9.34.

*Example 3*

3 - [(2 - diethylaminoethyl)amino]tropane bismethiodide.—A solution of 6.0 g. of 3-[(2-diethylaminoethyl)-amino]tropane in 50 cc. of ethanol was treated with 3.5 ml. of methyl iodide. The crystalline product which separated was collected by filtration and recrystallized from dilute ethanol, giving 7.5 g. of 3-[(2-diethylaminoethyl)amino]tropane bismethiodide, M. P. 269° C. (dec.).

*Analysis.*—Calcd. for C$_{16}$H$_{35}$I$_2$N$_3$: N, 8.03; I, 48.5. Found: N, 7.66; I, 48.2.

3-[(2-diethylaminoethyl)amino]tropane bismethiodide was found to have a ganglionic blocking activity about equal to that of hexamethylene-bis(trimethylammonium bromide) (hexamethonium bromide) when measured by its effect upon the nictitating membrane of the cat. It was about 1.2 times as effective as hexamethonium bro-

Example 4

*3-[(2 - diethylaminoethyl)amino]tropane bismethobromide.*—An excess of methyl bromide gas (7.0 g.) was passed into a solution of 5.0 g. of 3-[(2-diethylaminoethyl)amino]tropane in 25 cc. of methanol over a period of fifteen minutes with external cooling. The crystalline product which separated was collected by filtration and recrystallized from methanol, giving 3-[(2-diethylaminoethyl)amino]tropane bismethobromide, M. P. 289–290° C. (dec.).

*Analysis.*—Calcd. for $C_{16}H_{35}Br_2N_3$: N, 9.78; Br, 37.2. Found: N, 9.74; Br, 37.0.

Example 5

*3 - [(2 - diethylaminoethyl)methylamino]tropane [I; Y=N(CH$_3$), n=2, m=1, R=CH$_3$, N=B=N(C$_2$H$_5$)$_2$].*— 3-(2-diethylaminoethylamino)tropane (59 g.) was cooled to solid carbon dioxide temperature and 54 cc. of 100% formic acid was added, followed by 24.6 cc. of 36% aqueous formaldehyde solution. The mixture was heated on a steam bath for sixteen hours, cooled, made basic with 35% sodium hydroxide, and the product was extracted with ether, dried over potassium hydroxide and distilled. The fraction boiling at 120–123° C. (0.8–1.0 mm.) was collected, giving 42.5 g. of 3-[(2-diethylaminoethyl)methylamino]tropane, $n_D^{25}$=1.4871.

Example 6

*3 - [(2-diethylaminoethyl)methylamino]tropane trihydrobromide.*—A solution of 20 g. of 3-[(2-diethylaminoethyl)methylamino]-tropane in 250 cc. of absolute ethanol was treated with an excess of alcoholic hydrogen bromide. The crystalline material (34.4 g.) which separated was collected by filtration, recrystallized from methanol and dried for two hours at 100° C. (0.1 mm.), giving 3-[(2 - diethylaminoethyl)methylamino]tropane trihydrobromide, M. P. above 140° C.

*Analysis.*—Calcd. for $C_{15}H_{31}N_3.3HBr$: C, 36.31; H, 6.91; Br, 48.3. Found: C, 35.88; H, 7.09; Br, 47.9.

Example 7

*3 - [(2 - diethylaminoethyl)methylamino]tropane bismethiodide.*—A 10 g. sample of the trihydrobromide salt of 3 - [(2 - diethylaminoethyl)methylamino]tropane, prepared as described above in Example 6, was converted to the free base by treatment with dilute sodium hydroxide solution and extraction of the product. The free base was dissolved in 50 cc. of ethanol and 4 ml. of methyl iodide was added. After four hours the crystalline material which had separated was collected by filtration, dried at 70° C. and recrystallized from methanol, giving 6.2 g. of 3-[(2-diethylaminoethyl)methylamino]tropane bismethiodide, M. P. 242–244° C.

Example 8

*3 - [(2 - diethylaminoethyl)methylamino]tropane bismethobromide.*—Excess methyl bromide was added to a solution of 5.0 g. of 3-[(2-diethylaminoethyl)methylamino]tropane in 50 cc. of acentonitrile at 0° C. The solution was warmed to 30° C., then cooled and kept at room temperature for three hours. The crystalline material which separated was collected by filtration, washed with acetone, recrystallized from isopropyl alcohol, and dried at 70° C., giving 4.4 g. of 3-[(2-diethylaminoethyl)-methylamino]tropane bismethobromide, M. P. 245–247° C. (dec.).

*Analysis.*—Calcd. for $C_{17}H_{37}N_3Br_2$: N, 9.48; Br, 36.1. Found: N, 9.15; Br, 35.4.

Example 9

*3 - [(2 - diethylaminoethyl)methylamino]tropane bisethiodide.*—A solution of 2.5 g. of 3-[(2-diethylaminoethyl)methylamino]-tropane (Example 5), and 2 ml. of ethyl iodide in 5 ml. of absolute ethanol was kept at room temperature for fifteen minutes, then warmed to 60° C. and allowed to stand at room temperature for about fifteen hours. The crystalline product (3.3 g.) was collected by filtration, recrystallized twice from methanol and dried at 55° C., giving 1.17 g. of 3-[(2-diethylaminoethyl)methylamino]tropane bisethiodide, M. P. 237–238° C.

*Analysis.*—Calcd. for $C_{19}H_{41}I_2N_3$: N, 7.45; I, 44.98. Found: N, 7.47; I, 45.30.

Example 10

*3 - (2-dimethylaminoethylamino)tropane [I; Y=NH, n=2, m=1, R=CH$_3$, N=B=N(CH$_3$)$_2$]* was prepared from 66.6 g. of 3-tropanone and 35.2 g. of 2-dimethylaminoethylamine according to the manipulative procedure described in Example 1. There was thus obtained 62.6 g. of 3-(2-dimethylaminoethylamino)tropane, B. P. 101.5–103° C. (0.5 mm.), $n_D$=1.4880.

Example 11

*3 - [(2-dimethylaminoethyl)methylamino]tropane [I; Y=N(CH$_3$), n=2, m=1, R=CH$_3$, N=B=N(CH$_3$)$_2$].*— 3-(2-dimethylaminoethylamino)tropane (31.6 g., 0.15 mole), prepared as described in Example 10, was cooled to −80° C. by means of a Dry Ice-acetone bath, and then 39 ml. of 100% formic acid was added portion-wise followed by 15 ml. of 35% formaldehyde. The mixture was allowed to warm to room temperature and then heated on a steam bath for sixteen hours. The reaction mixture was then cooled, poured into an excess of concentrated potassium carbonate solution, and the product was extracted with ether. The ether extracts were dried over anhydrous calcium sulfate and concentrated, and the residue was distilled, giving 21 g. of 3-[(2-dimethylaminoethyl)methylamino]tropane, B. P. 104–107° C. (1.2 mm.), $n_D^{25}$=1.4900-9.

Example 12

*3 - [(2-dimethylaminoethyl)methylamino]tropane bismethiodide* was prepared from a solution of 4.50 g. of 3-[(2-dimethylaminoethyl)methylamino]tropane (Example 11) and 6.25 g. of methyl iodide in 25 ml. of ethanol. The crystalline product which separated was recrystallized from methanol and dried for one-half hour at 100° C. giving 7.0 g. of 3-[(2-dimethylaminoethyl)-methylamino]tropane bismethiodide, M. P. 238–241° C. (dec.).

*Analysis.*—Calcd. for $C_{15}H_{34}I_2N_3$: I, 49.8; N, 8.25. Found: I, 49.9; N, 8.20.

Example 13

*3-[3-(1-piperidyl)propylamino]tropane [I; Y=NH, n=3, m=1, R=CH$_3$, N=B=NC$_5$H$_{10}$]* was prepared from 46 g. of 3-tropanone and 42.7 g. of 3-(1-piperidyl)propylamine according to the manipulative procedure described in Example 1. There was thus obtained 65.6 g. of 3-[3-(1-piperidyl)propylamino]tropane, B. P. 141–150° C. (0.5 mm.).

*Analysis.*—Calcd. for $C_{16}H_{31}N_3$: N, 15.83. Found: N, 15.46.

Example 14

*3-{[3-(1-piperidyl)propyl]methylamino}tropane [I; Y=N(CH$_3$), n=3, m=1, R=CH$_3$, N=B=NC$_5$H$_{10}$]* was prepared from 32.8 g. of 3-[3-(1-piperidyl)propylamino]-tropane (Example 13), 32 ml. of formic acid and 12.3 ml. of 36% formaldehyde according to the manipulative procedure described in Example 11. There was thus obtained 27.4 g. of 3-{[3-(1-piperidyl)propyl]methylamino}-tropane, B. P. 141–148° C. (0.2 mm.), $n_D^{25}$=1.5057.

*Analysis.*—Calcd. for $C_{17}H_{33}N_3$: C, 73.06; H, 11.90; N, 15.04. Found: C, 72.89; H, 12.15; N, 14.88.

Example 15

3-{[3-(1-piperidyl)propyl]methylamino}tropane bisethiodide was prepared from a solution of 4.8 g. of 3-{[3-(1-piperidyl)propyl]methylamino}tropane (Example 14) and 5.78 g. of ethyl iodide in 50 ml. of ethanol. The crystalline product which separated was recrystallized three times from ethanol and dried at 100° C., giving 4.2 g. of 3-{[3-(1-piperidyl)propyl]methylamino}tropane bisethiodide, M. P. 222–233° C.

*Analysis.*—Calcd. for $C_{21}H_{43}I_2N_3$: I, 42.92; N, 7.11. Found: I, 44.00; N, 6.84.

Example 16

3-{[3-(1-piperidyl)propyl]methylamino}tropane trismethiodide was prepared from a solution of 4.8 g. of 3-{[3-(1-piperidyl)propyl]methylamino}tropane (Example 14) and 5.31 g. of methyl iodide in 50 ml. of absolute ethanol. The crystalline product which separated was recrystallized twice from methanol, giving 2.2 g. of 3-{[3-(1-piperidyl)propyl]methylamino}tropane trismethiodide, M. P. 207–214° C.

*Analysis.*—Calcd. for $C_{20}H_{42}I_3N_3$: I, 53.99; N, 5.96. Found: I, 53.2; N, 5.70.

Example 17

3-[2-(1-piperidyl)ethylamino]tropane [I; Y=NH, n=2, m=1, R=CH$_3$, N=B=NC$_5$H$_{10}$] was prepared from 46 g. of 3-tropanone and 38.5 g. of 2-(1-piperidyl)ethylamine according to the manipulative procedure described in Example 1. There was thus obtained 65 g. of 3-[2-(1-piperidyl)ethylamino]tropane, B. P. 132–133° C. (0.5 mm.).

*Analysis.*—Calcd. for $C_{15}H_{29}N_3$: N, 16.71. Found: N, 16.16.

Example 18

3-[2-(1-piperidyl)ethylamino]tropane trihydrochloride.—A solution of 3-[2-(1-piperidyl)ethylamino]tropane in ethanol was treated with an excess of ethanolic hydrogen chloride, and the product which separated was recrystallized twice from ethanol, giving 3-[2-(1-piperidyl)ethylamino]tropane trihydrochloride, M. P. 275–277° C.

Example 19

3-[2-(1-piperidyl)ethylamino]tropane bismethiodide.—A solution of 3 g. of 3-[2-(1-piperidyl)ethylamino]tropane in 10 ml. of ethanol was treated with 3 ml. of methyl iodide. The crystalline product which separated was collected by filtration and recrystallized from ethanol, giving 5.0 g. of 3-[2-(1-piperidyl)ethylamino]tropane bismethiodide, M. P. 293° C. (dec.).

*Analysis.*—Calcd. for $C_{17}H_{35}I_2N_3$: N, 7.85; I, 47.4. Found: N, 7.75; I, 47.2.

Example 20

3-{[2-(1-piperidyl)ethyl]methylamino}tropane [I; Y=N(CH$_3$), n=2, m=1, R=CH$_3$, N=B=NC$_5$H$_{10}$] was prepared from 32.5 g. of 3-[2-(1-piperidyl)ethylamino]tropane (Example 17), 33.5 ml. of formic acid and 12.9 ml. of 36% formaldehyde according to the manipulative procedure described in Example 11. There was thus obtained 26.9 g. of 3-{[2-(1-piperidyl)ethyl]methylamino}tropane, B. P. 118.5–126° C. (0.07 mm.).

*Analysis.*—Calcd. for $C_{16}H_{31}N_3$: C, 72.40; H, 11.77; N, 15.83. Found: C, 72.26; H, 11.89; N, 15.64.

Example 21

3-{[2-(1-piperidyl)ethyl]methylamino}tropane trihydrobromide.—A solution of 15 g. of 3-{[2-(1-piperidyl)ethyl]methylamino}tropane in 30 ml. of ethanol was treated with excess alcoholic hydrogen bromide. The solution was diluted with ethanol to a volume of 500 ml. and the product was induced to crystallize. The product was collected by filtration and dried, giving 5.7 g. of 3-{[2-(1-piperidyl)ethyl]methylamino}tropane trihydrobromide, M. P. 220–224.5° C.

*Analysis.*—Calcd. for $C_{16}H_{31}N_3 \cdot 3HBr$: N, 8.27; Br, 47.2. Found: N, 8.24; Br, 46.6.

Example 22

3-{[2-(1-piperidyl)ethyl]methylamino}tropane bismethiodide was prepared from a solution of 4.5 g. of 3-{[2-(1-piperidyl)ethyl]methylamino}tropane (Example 20) and 5.31 g. of methyl iodide in 45 ml. of anhydrous ethanol. The crystalline product which separated was recrystallized twice from methanol, during which process some material insoluble in the hot methanol was removed by filtration, giving 2.7 g. of 3-{[2-(1-piperidyl)ethyl]methylamino}tropane bismethiodide, M. P. 259–266° C.

*Analysis.*—Calcd. for $C_{18}H_{37}I_2N_3$: N, 7.65; I, 46.21. Found: N, 7.16; I, 47.00.

Example 23

3-{[2-(1-piperidyl)ethyl]methylamino}tropane bisethiodide was prepared from a solution of 4.5 g. of 3-{[2-(1-piperidyl)ethyl]methylamino}tropane and 5.78 g. of ethyl iodide in 5 ml. of ethanol. The product which separated was recrystallized from ethanol, giving 2.5 g. of 3-{[2-(1-piperidyl)ethyl]methylamino}tropane bisethiodide, M. P. 215–219° C.

*Analysis.*—Calcd. for $C_{20}H_{41}N_3I_2$: N, 7.28; I, 44.0. Found: N, 7.20; I, 43.2.

Example 24

3-[3-(1-pyrrolidyl)propylamino]tropane [I; Y=NH, n=3, m=1, R=CH$_3$, N=B=NC$_4$H$_8$] was prepared from 46 g. of 3-tropanone and 38.5 g. of 3-(1-pyrrolidyl)propylamine according to the manipulative procedure described in Example 1. There was thus obtained 49.5 g. of 3-[3-(1-pyrrolidyl)propylamino]tropane, B. P. 140–144° C. (0.05 mm.).

Example 25

3-{[3-(1-pyrrolidyl)propyl]methylamino}tropane [I; Y=N(CH$_3$), n=3, m=1, R=CH$_3$, N=B=NC$_4$H$_8$] was prepared from 25 g. of 3-[3-(1-pyrrolidyl)propylamino]tropane (Example 24), 26 ml. of formic acid and 10 ml. of 36% formaldehyde according to the manipulative procedure described in Example 11. There was thus obtained 8.9 g. of 3-{[3-(1-pyrrolidyl)propyl]methylamino}tropane, B. P. 129–131° C. (0.2 mm.), $n_D^{24}$= 1.5031–40.

*Analysis.*—Calcd. for $C_{16}H_{31}N_3$: C, 72.40; H, 11.77; N, 15.83. Found: C, 71.80; H, 11.48; N, 15.71.

Example 26

3-{[3-(1-pyrrolidyl)propyl]methylamino}tropane bismethiodide was prepared from 8.6 g. of 3-{[3-(1-pyrrolidyl)propyl]methylamino}tropane and 10.1 g. of methyl iodide in 75 ml. of ethanol. The total crystalline product was leached with 200 ml. of hot ethanol and the mixture was filtered. The material which crystallized from the filtrate was recrystalized from ethanol, giving 5 g. of 3-{[3-(1-pyrrolidyl)propyl]methylamino}tropane bismethiodide, M. P. 226–228° C.

*Analysis.*—Calcd. for $C_{18}H_{37}I_2N_3$: N, 7.65; I, 46.2. Found: N, 7.60; I, 46.2.

Example 27

3-[2-(1-pyrrolidyl)ethylamino]tropane [I; Y=NH, n=2, m=1, R=CH$_3$, N=B=NC$_4$H$_8$] was prepared from 46 g. of 3-tropanone and 34.2 g. of 2-(1-pyrrolidyl)ethylamine according to the manipulative procedure described in Example 1. There was thus obtained 31.6 g. of 3-[2-(1-pyrrolidyl)ethylamino]tropane, B. P. 130–135° C. (0.5 mm.).

Example 28

3-[2-(1-pyrrolidyl)ethylamino]tropane bismethiodide.—A solution of 3.5 g. of 3-[2-(1-pyrrolidyl)ethylamino]tropane in 50 cc. of ethanol was treated with 4 cc. of methyl iodide. The crystalline material which separated was collected by filtration and recrystallized from methanol, giving 4.2 g. of 3-[2-(1-pyrrolidyl)ethylamino]tropane bismethiodide, M. P. 290–293° C. (dec.).

Analysis.—Calcd. for $C_{16}H_{33}I_2N_3$: N, 8.07; I, 48.7. Found: N, 7.80; I, 48.6.

Example 29

3 - {[2 - (1 - pyrrolidyl)ethyl]methylamino}tropane [I; Y=N(CH₃), n=2, m=1, R=CH₃, N=B=NC₄H₈] was prepared from 23.7 g. of 3-[2-(1-pyrrolidyl)ethylamino]tropane (Example 17) according to the manipulative procedure described in Example 11. There was thus obtained 9.6 g. of 3-{[2-(1-pyrrolidyl)ethyl]methylamino}tropane, B. P. 122–124° C. (0.3 mm.), $n_D^{24}$=1.5055–60.

Example 30

3 - {[2 - (1 - pyrrolidyl)ethyl]methylamino}tropane bismethiodide was prepared from a solution of 5.1 g. of 3-{[2-(1-pyrrolidyl)ethyl]methylamino}tropane and 6.3 g. of methyl iodide in 30 ml. of ethanol. The product which separated was recrystallized from methanol, giving 4.1 g. of 3-{[2-(1-pyrrolidyl)ethyl]methylamino}tropane bismethiodide, M. P. 205–220° C.

Analysis.—Calcd. for $C_{17}H_{35}I_2N_3$: N, 7.85; I, 47.42. Found: N, 7.74; I, 48.00.

Example 31

3-[4-(1-pyrrolidyl)butylamino]tropane [I; Y=NH, n=4, m=1, R=CH₃, N=B=NC₄H₈] was prepared from 27.2 g. of 3-tropanone and 25.2 g. of 4-(1-pyrrolidyl)butylamine according to the manipulative procedure described in Example 1. There was thus obtained 35.1 g. of 3-[4-(1-pyrrolidyl)butylamino]tropane, B. P. 142–148° C. (0.3 mm.), $n_D^{25}$=1.5038–41.

Example 32

3 - {[4 - (1 - pyrrolidyl)butyl]methylamino}tropane [I; Y=N(CH₃), n=4, m=1, R=CH₃, N=B=NC₄H₈] was prepared from 30.8 g. of 3-[4-(1-pyrrolidyl)butylamino]tropane (Example 31), 30 ml. of formic acid and 11.6 ml. of 36% formaldehyde according to the manipulative procedure described in Example 11. There was thus obtained 14.3 g. of 3-{[4-(1-pyrrolidyl)butyl]methylamino}tropane, B. P. 138–140° C. (0.2 mm.), $n_D^{25.5}$=1.5029.

Example 33

3-[2-(4-morpholinyl)ethylamino]tropane [I; Y=NH, n=2, m=1, R=CH₃, N=B=NC₄H₈O] was prepared from 42 g. of 3-tropanone, 42 g. of 4-(2-aminoethyl)morpholine and 0.6 g. of platinum oxide catalyst according to the manipulative procedure given above in Example 1. There was thus obtained 51 g. of 3-[2-(4-morpholinyl)ethylamino]tropane, B. P. 133–135° C. (0.4 mm.), $n_D^{25}$=1.5066.

Example 34

3-[2-(4-morpholinyl)ethylamino]tropane trihydrochloride.—A solution of 5.0 g. of 3-[2-(4-morpholinyl)ethylamino]tropane in 50 ml. of ethanol was treated with an excess of ethanolic hydrogen chloride. The product which separated was collected by filtration and recrystallized from methanol, giving 5.5 g. of 3-[2-(4-morpholinyl)ethylamino]tropane trihydrochloride, M. P. 245–249.5° C. (dec.).

Example 35

3-[2-(4-morpholinyl)ethylamino]tropane bismethiodide.—A solution of 7.0 g. of 3-[2-(4-morpholinyl)ethylamino]tropane in 150 cc. of ethanol was treated with 6 cc. of methyl iodide. The crystalline material which separated was collected by filtration and recrystallized first from dilute ethanol and then from water, giving 3.8 g. of 3-[2-(4-morpholinyl)ethylamino]tropane bismethiodide, M. P. 264.5–265° C. (dec.).

Analysis.—Calcd. for $C_{16}H_{33}I_2N_3O$: N, 7.82; I, 47.24. Found: N, 7.54; I, 46.86.

Example 36

3 - {[2 - (4 - morpholinyl)ethyl]methylamino}tropane [I; Y=N(CH₃), n=2, m=1, R=CH₃, N=B=NC₄H₈O] was prepared from 36.5 g. of 3-[2-(4-morpholinyl)ethylamino]tropane, 37.6 cc. of formic acid and 14.5 cc. of 36% formaldehyde solution according to the manipulative procedure described above in Example 11. There was thus obtained 29.3 g. of 3-{[2-(4-morpholinyl)ethyl]methylamino}tropane, B. P. 124–130° C. (0.1 mm.), $n_D^{25}$=1.5079–83.

Example 37

3-{[2-(4-morpholinyl)ethyl]methylamino}tropane trihydrobromide.—A solution of 3-{[2-(4-morpholinyl)ethyl]methylamino}tropane in ethanol was treated with an excess of ethanolic hydrogen bromide. The product which separated was collected by filtration and recrystallized from methanol, giving 3-{[2-(4-morpholinyl)ethyl]methylamino}tropane trihydrobromide, M. P. 252–254° C. (dec.).

Analysis.—Calcd. for $C_{15}H_{29}N_3O·3HBr$: C, 35.31; H, 6.32; Br, 47.0. Found: C, 35.31; H, 6.83; Br, 46.8.

Example 38

3-{[2-(4-morpholinyl)ethyl]methylamino}tropane bismethiodide.—A solution of 5.0 g. of 3-{[2-(4-morpholinyl)ethyl]methylamino}tropane in 50 cc. of ethanol was treated with 4 cc. of methyl iodide. The crystalline material which separated was collected by filtration and recrystallized twice from methanol, giving 3-{[2-(4-morpholinyl)ethyl]methylamino}tropane bismethiodide, M. P. 218–220° C.

Analysis.—Calcd. for $C_{17}H_{35}I_2N_3O$: N, 7.62; I, 46.0. Found: N, 7.29; I, 45.3.

Example 39

3-(3-dimethylaminopropylamino)tropane [I; Y=NH, n=3, m=1, R=CH₃, N=B=N(CH₃)₂] was prepared from 46 g. of 3-tropanone and 30.7 g. of 3-dimethylaminopropylamine according to the manipulative procedure described in Example 1. The product was distilled at 108–119° C. (0.1 mm.) and then redistilled giving 38.0 g. of 3-(3-dimethylaminopropylamino)tropane, B. P. 112–114° C. (1.7 mm.), $n_D^{24}$=1.4990.

The picrate was prepared by dropwise addition of an ethanol solution of the free base to a solution of picric acid in ethanol. The picrate which separated was recrystallized twice from dimethylformamide, giving a sample, M. P. about 230° C. Analysis showed it to be a tripicrate.

Analysis.—Calcd. for $C_{31}H_{36}N_{12}O_{21}:N(NO_2)$, 13.81. Found: $N(NO_2)$, 13.79.

Example 40

3 - [(3 - dimethylaminopropyl)methylamino]tropane [I; Y=N(CH₃), n=3, m=1, R=CH₃, N=B=N(CH₃)₂] was prepared from 30 g. of 3-(3-dimethylaminopropylamino)tropane (Example 39), 30 ml. of formic acid and 14.1 ml. of 37% formaldehyde according to the manipulative procedure described in Example 11. There was thus obtained 24.8 g. of 3-[(3-dimethylaminopropyl)methylamino]tropane, B. P. 106–112° C. (0.5 mm.), $n_D^{26}$=1.4885–8.

The picrate, prepared as described for the compound of Example 39, had the M. P. 231° C. (dec.).

Example 41

3 - (3 - diethylaminopropylamino)tropane [I; Y=NH, n=3, m=1, R=CH₃, N=B=N(C₂H₅)₂] was prepared from 46 g. of 3-tropanone and 39.1 g. of 3-diethylaminopropylamine according to the manipulative procedure described in Example 1. There was thus obtained 52.5 g. of 3-(3-diethylaminopropylamino)tropane, B. P. 120–125° C. (0.1 mm.), $n_D^{25}$=1.4862.

The picrate, prepared as described for the compound of Example 39, had the M. P. 212° C. (dec.).

Example 42

3 - [(3 - diethylaminopropyl)methylamino]tropane [I; Y=N(CH$_3$), n=3, m=1, R=CH$_3$, N=B=N(C$_2$H$_5$)$_2$] was prepared from 49.0 g. of 3-(3-diethylaminopropylamino)tropane (Example 41), 50 ml. of formic acid and 19.2 ml. of 37% formaldehyde according to the manipulative procedure described in Example 11. The product was distilled at 128–148° C. (0.8 mm.) and then redistilled, giving 31.4 g. of 3-[(3-diethylaminopropyl)methylamino]tropane, B. P. 120–123° C. (0.1 mm.), $n_D^{25}$=1.4870.

Analysis.—Calcd. for C$_{16}$H$_{33}$N$_3$: C, 71.85; H, 12.44; N, 15.71. Found: C, 71.81; H, 12.47; N, 15.59.

Example 43

3 - [(3 - diethylaminopropyl)methylamino]tropane bismethiodide was prepared from a solution of 2.67 g. of 3-[(3-diethylaminopropyl)methylamino]tropane (Example 42) and 1.25 ml. of methyl iodide in 75 ml. of ethanol. There separated from solution 3.2 g. of 3-[(3-diethylaminopropyl)methylamino]tropane bismethiodide, M. P. 222–227° C.

Analysis.—Calcd. for C$_{18}$H$_{39}$I$_2$N$_3$: I, 46.2. Found: I, 46.6.

Example 44

N,N' - bis(3 - tropanyl)ethylenediamine [I; Y=NH, n=2, m=1, R=CH$_3$, N=B=A].—A mixture of 40 g. of 3-tropanone, 8.4 g. of ethylenediamine, 1.5 g. of platinum oxide catalyst and 150 ml. of ethanol was shaken in a hydrogen atmosphere at a pressure of 49 lbs. per sq. inch. After six hours 1 mole of hydrogen had been taken up, the reaction mixture was filtered, and the filtrate was concentrated and distilled, giving N,N'-bis-(3-tropanyl)ethylenediamine, B. P. 178–181° C. (0.6 mm.).

Example 45

N,N' - bis(3 - tropanyl) - N,N' - dimethylethylenediamine [I; Y=N(CH$_3$), n=2, m=1, R=CH$_3$, N=B=A] was prepared from 27 g. of N,N'-bis-(3-tropanyl)ethylenediamine (Example 44), 18.3 ml.. of 36% formaldehyde and 40 ml. of formic acid according to the manipulative procedure described in Example 11. There was thus obtained 19.3 g. of N,N'-bis(3-tropanyl)-N,N'-dimethylethylenediamine, B. P. 192–200° C. (1.5 mm.), which solidified upon standing.

Example 46

N,N' - bis(3 - tropanyl) - N,N' - dimethylethylenediamine bismethiodide was prepared from a solution of 3.30 g. of N,N'-bis(3-tropanyl)N,N'-dimethylethylenediamine (Example 45) and 3.02 g. of methyl iodide in 20 ml. of absolute ethanol. The crystalline product which separated was recrystallized twice from methanol and dried at 100° C., giving 2.0 g. of N,N'-bis(3-tropanyl)-N,N'-dimethylethylenediamine bismethiodide, M. P. 273–274° C. (dec.).

Analysis.—Calcd. for C$_{22}$H$_{44}$I$_2$N$_4$: N, 9.06; I, 41.04. Found: N, 8.84; I, 41.03.

Example 47

3-(2-dimethylaminoethoxy)tropane [II; Y'=O, n=2, m=1, R=CH$_3$, N=B'=N(CH$_3$)$_2$].—A solution of 60 g. of tropine in 50 ml. of toluene was added to a stirred suspension of 9.2 g. of sodium in 100 ml. of toluene, and the mixture was refluxed for four hours. A solution of 42.8 g. of 2-dimethylaminoethyl chloride in 50 cc. of toluene was then added, and the reaction mixture was refluxed for three hours. After cooling, methanol and water were carefully added, the organic layer was separated and concentrated, and the residue distilled at 86–91° C. (1.0 mm.), and then redistilled, giving 17.3 g. of 3-(2-dimethylaminoethoxy)tropane, B. P. 85–85.5° C. (0.9 mm.), $n_D^{25}$=1.4836.

Example 48

3-(2-dimethylaminoethoxy)tropane bisperchlorate.—A solution of 2.12 g. of 3-(2-dimethylaminoethoxy)tropane (Example 47) in 25 ml. of acetic acid was added to a solution of 3.0 g. of 72% perchloric acid in 25 ml. of acetic acid. A heavy precipitate formed which was collected by filtration, recrystallized from 90% aqueous acetic acid and dried at 75° C., giving 2.0 g. of 3-(2-dimethylaminoethoxy)tropane bisperchlorate, M. P. 243–246° C.

Analysis.—Calcd. for C$_{12}$H$_{24}$N$_2$O.2HClO$_4$: C, 34.87; H, 6.34; N, 6.78. Found: C, 35.10; H, 6.63; N, 6.71.

Example 49

3 - (2 - dimethylaminoethoxy)tropane bismethiodide was prepared from a solution of 2.12 g. of 3-(2-dimethylaminoethoxy)tropane (Example 47) and 2.0 ml. of methyl iodide in 15 ml. of ethanol. The crystalline product which separated was recrystallized twice from methanol and dried for four hours at 100° C., giving 1.4 g. of 3-(2-dimethylaminoethoxy)tropane bismethiodide, M. P. 314–315° C. (dec.).

Analysis.—Calcd. for C$_{14}$H$_{30}$I$_2$N$_2$O: I, 51.15; N, 5.65. Found: I, 51.17; N, 5.59.

Example 50

3 - (2 - dimethylaminoethoxy)tropane bisethiodide was prepared from a solution of 2.12 g. of 3-(2-dimethylaminoethoxy)tropane (Example 47) and 2.0 ml. of ethyl iodide in 10 ml. of ethanol. The crystalline product which separated was dried at 100° C. for forty-eight hours, giving 2.0 g. of 3-(2-dimethylaminoethoxy)tropane bisethiodide, M. P. 269–275° C.

Analysis.—Calcd. for C$_{16}$H$_{34}$I$_2$N$_2$O: I, 49.36. Found: I, 49.60.

Example 51

3 - (2 - diethylaminoethoxy)tropane [II; Y'=O, n=2, m=1, R=CH$_3$, N=B'=N(C$_2$H$_5$)$_2$] was prepared from 60 g. of tropine, 9.2 g. of sodium and 54 g. of 2-diethylaminoethyl chloride according to the manipulative procedure described in Example 47. There was thus obtained 38.3 g. of 3-(2-diethylaminoethoxy)tropane, B. P. 101° C. (0.07 mm.), $n_D^{25}$=1.4758.

Example 52

3 - (2 - diethylaminoethoxy)tropane bismethiodide was prepared from a solution of 7.2 g. of 3-(2-diethylaminoethoxy)tropane (Example 51) and 5 ml. of methyl iodide in 30 ml. of ethanol. The crystalline product which separated was recrystallized twice from methanol and dried at 100° C. for twenty-four hours, giving 6.0 g. of 3-(2-diethylaminoethoxy)tropane bismethiodide, M. P. 301–302° C. (dec.).

Analysis.—Calcd. for C$_{16}$H$_{34}$I$_2$N$_2$O: N, 5.34; I, 48.5. Found: N, 5.37; I, 49.6.

3 - (2 - diethylaminoethoxy)tropane bismethiodide was found to be 0.73 and 2.3 times as effective as hexamethonium bromide in blockade of the parasympathetic and sympathetic ganglia, respectively, when measured by the carotid occlusion test in dogs.

Example 53

3-(2-diethylaminoethoxy)tropane bisallobromide can be prepared from a solution of 3-(2-diethylaminoethoxy)-tropane (Example 51) and an excess of allyl bromide in ethanol.

Example 54

3-(2-diethylaminoethoxy)tropane bisbenzochloride can be prepared from a solution of 3-(2-diethylaminoethoxy)- tropane (Example 51) and an excess of benzyl chloride in ethanol.

Example 55

3-[2-(1-piperidyl)ethoxy]tropane [II; Y'=O, n=2, m=1, R=CH₃, N=B'=NC₅H₁₀] was prepared from 64 g. of tropine, 9.85 g. of sodium and 63 g. of 2-(1-piperidyl)ethyl chloride according to the manipulative procedure described above in Example 47. There was thus obtained 40 g. of 3-[2-(1-piperidyl)ethoxy]tropane, B. P. 106–109° C. (0.07 mm.).

*Analysis.*—Calcd. for $C_{15}H_{28}N_2O$: N, 11.10. Found: N, 11.06.

Example 56

3 - [2-(1 - piperidyl)ethoxy]tropane bismethiodide.—A solution of 5.04 g. of 3-[2-(1-piperidyl)ethoxy]tropane in 25 ml. of ethanol was treated with 5.69 g. of methyl iodide. The crystalline product which separated was collected by filtration and recrystallized from ethanol, giving 7.0 g. of 3-[2-(1-piperidyl)ethoxy]tropane bismethiodide, M. P. above 305° C.

*Analysis.*—Calcd. for $C_{17}H_{34}I_2N_2O$: N, 5.23; I, 47.3. Found: N, 5.31; I, 47.5.

Example 57

3 - [3 - (1-piperidyl)propoxy]tropane [II; Y'=O, n=3, m=1, R=CH₃, N=B'=NC₅H₁₀] was prepared from 56.3 g. of tropine, 8.65 g. of sodium and 60.7 g. of 3-(1-piperidyl)propyl chloride according to the manipulative procedure described above in Example 47. There was thus obtained 61.3 g. of 3-[3-(1-piperidyl)propoxy]tropane, B. P. 115° C. (0.1 mm.).

*Analysis.*—Calcd. for $C_{16}H_{30}N_2O$: N, 10.52. Found: N, 10.36.

Example 58

3-[3-(1-piperidyl)propoxy]tropane bismethiodide.—A solution of 5.32 g. of 3-[3-(1-piperidyl)propoxy]tropane in 25 ml. of ethanol was treated with 5.69 g. of methyl iodide. The crystalline material which separated was collected by filtration and recrystallized twice from ethanol, giving 8.0 g. of 3-[3-(1-piperidyl)propoxy]tropane bismethiodide, M. P. above 305° C.

*Analysis.*—Calcd. for $C_{18}H_{36}I_2N_2O$: I, 46.1; C, 39.28; H, 6.59. Found: I, 45.8; C, 38.66; H, 6.81.

Example 59

3-[2-(1-pyrrolidyl)ethoxy]tropane [II; Y'=O, n=2, m=1, R=CH₃, N=B'=NC₄H₈].—A solution of 42 g. of tropine in 100 ml. of dry toluene was added during one-half hour to a suspension of 12 g. of sodium amide in 100 ml. of dry toluene, and the mixture was refluxed for six hours. A solution of 51 g. of 2-(1-pyrrolidyl)ethyl chloride in 50 ml. of dry toluene was then added dropwise during one hour, and the reaction mixture was refluxed for six hours. After cooling, ethanol and water were carefully added, the organic layer was separated and concentrated, and the residue was distilled at 113–123° C. (1.2 mm.) and redistilled, giving 19 g. of 3-[2-(1-pyrrolidyl)ethoxy]tropane, B. P. 134° C. (2.8 mm.), $n_D^{25}=1.4932$.

Example 60

3-[2-(1-pyrrolidyl)ethoxy]tropane bismethiodide was prepared from a solution of 6.33 g. of 3-[2-(1-pyrrolidyl)ethoxy]tropane (Example 59) and 4.25 ml. of methyl iodide in 150 ml. of ethanol. The crystalline product which separated was recrystallized from ethanol and dried at 100° C. for twenty-four hours, giving 5.0 g. of 3-[2-(1-pyrrolidyl)ethoxy]tropane bismethiodide, M. P. 313–314° C.

*Analysis.*—Calcd. for $C_{16}H_{32}I_2N_2O$: I, 48.6. Found: I, 49.3.

3-[2-(1-pyrrolidyl)ethoxy]tropane bismethiodide was found to have a ganglionic blocking activity equal to that of hexamethonium bromide (see Example 3).

Example 61

3-(2 - diethylaminoethoxy)pseudotropane [II; Y'=O, n=2, m=1, R=CH₃, N=B'=N(C₂H₅)₂] was prepared from 49.2 g. of pseudotropine, 7.6 g. of sodium and 44.3 g. of 2-diethylaminoethyl chloride using the manipulative procedure described in Example 47, except that benzene was used as the reaction medium instead of toluene. There was thus obtained 3-(2-diethylaminoethoxy)pseudotropane, B. P. 109–112° C. (0.25 mm.), $n_D^{25}=1.4775$. This is a stereoisomer of the compound prepared in Example 51.

Example 62

3-(2-diethylaminoethoxy)pseudotropane bismethiodide was prepared from 5.3 g. of 3-(2-diethylaminoethoxy)pseudotropane (Example 61) and 6.91 g. of methyl iodide in 30 ml. of ethanol. There was thus obtained 6.3 g. of 3 - (2 - diethylaminoethoxy)pseudotropane bismethiodide, M. P. 307–308° C. (dec.).

Example 63

3-(3-diethylaminopropoxy)tropane [II; Y'=O, n=3, m=1, R=CH₃, N=B'=N(C₂H₅)₂] was prepared from 48.7 g. of tropine, 7.46 g. of sodium and 48.5 g. of 3-diethylaminopropyl chloride according to the manipulative procedure described above in Example 47. There was thus obtained 32 g. of 3-(3-diethylaminopropoxy)tropane, B. P. 94–96° C. (0.2 mm.).

*Analysis.*—Calcd. for $C_{15}H_{30}N_2O$: N, 11.01. Found: N, 10.79.

Example 64

3-(3-diethylaminopropoxy)tropane bismethiodide.—A solution of 5.1 g. of 3-(3-diethylaminopropoxy)tropane in 25 ml. of ethanol was treated with 5.69 g. of methyl iodide. The crystalline product which separated was collected by filtration and recrystallized from ethanol, giving 6.5 g. of 3-(3-diethylaminopropoxy)tropane bismethiodide, M. P. 300° C. (dec.).

*Analysis.*—Calcd. for $C_{17}H_{36}I_2N_2O$: N, 5.21; I, 47.1. Found: N, 5.24; I, 46.7.

Example 65

3-(2-diethylaminoethylmercapto)tropane [II; Y'=S, n=2, m=1, R=CH₃, N=B'=N(C₂H₅)₂] can be prepared by heating 3-bromotropane with 2-diethylaminoethylmercaptan in sodium hydroxide solution. The product can be isolated by extraction with ether and distillation.

Example 66

3-[3-(4-morpholinyl)propylamino]tropane [I; Y=NH, n=3, m=1, R=CH₃, N=B=NC₄H₈O] can be prepared from 3-tropanone and 3-(4-morpholinyl)propylamine according to the manipulative procedure described in Example 1.

Example 67

3-{[3(4-morpholinyl)propyl]methylamino}tropane [I; Y=N(CH₃), n=3, m=1, R=CH₃, N=B=NC₄H₈O] can be prepared from 3-[3-(4-morpholinyl)propylamino]tropane, formic acid and formaldehyde according to the manipulative procedure described in Example 11.

Example 68

3 - (2 - diethylaminopropoxy)tropane [II; Y'=O, $C_nH_{2n}$=CH₂CH(CH₃), m=1, R=CH₃,

N=B'=N(C₂H₅)₂]

can be prepared from tropine, sodium and 2-diethylaminopropyl chloride according to the manipulative procedure described in Example 47.

Example 69

3 - (2 - phenylmethylaminoethylamino)tropane [I; Y=NH, n=2, m=1, R=CH₃, N=B=N(CH₃)(C₆H₅)]

was prepared from 50.6 g. of N-methyl-N-phenylethylenediamine and 51.5 g. of 3-tropanone according to the manipulative procedure described in Example 1. There was thus obtained a product boiling at 157–171° C. (0.1 mm.) (27.2 g.) which was redistilled to give 3-(2-phenylmethylaminoethylamino)tropane, B. P. 167–173° C. (0.1 mm.).

*Example 70*

1-methyl-4-(3-tropanyl)-1,2,4,5-tetrahydro - 1,4 - benzodiazepine [V; R'=CH$_3$, m=1, R=CH$_3$, R''=H]. A solution of 26.5 cc. of 98% formic acid in 500 ml. of water was added to 29 g. of 3-(2-phenylmethylaminoethylamino)tropane. Formaldehyde (10 cc. of 37% solution) was added, and the mixture was heated on a steam bath for about fifteen hours. The ether mixture was concentrated and the residue was dried azeotropically and distilled, giving 10 g. of 1-methyl-4-(3-tropanyl)-1,2,4,5-tetrahydro-1,4-benzodiazepine, B. P. 155–165° C. (0.6 mm.).

*Example 71*

1-methyl-4-(3-tropanyl)-1,2,4,5-tetrahydro - 1,4 - benzodiazepine bismethiodide was prepared from a solution of 7.5 g. of 1-methyl-4-(3-tropanyl)-1,2,4,5-tetrahydro-1,4-benzodiazepine (Example 70) and 8.16 g. of methyl iodide in 35 ml. of anhydrous ethanol. The crystalline product which separated was recrystallized from water giving 5.2 g. of 1-methyl-4-(3-tropanyl)-1,2,4,5-tetrahydro-1,4-benzodiazepine bismethiodide, M. P. 264–267° C. (dec.).

*Analysis.*—Calcd. for C$_{20}$H$_{33}$N$_3$I$_2$: N, 7.38; I, 44.59; N(CH$_3$), 10.5  Found: N, 7.46; I, 44.20; N(CH$_3$), 10.4.

*Hofmann degradation.*—A column of 50 g. of ion exchange resin (Amberlite IRA-400) was washed with 10% sodium hydroxide solution until the eluates tested free of halogen, and then washed with water until the eluates tested free of base. A solution of 8.2 g. of 1-methyl-4-(3-tropanyl)-1,2,4,5-tetrahydro-1,4-benzodiazepine bismethiodide in 500 cc. of water was passed through the column. The column was washed with 1 liter of deionized water util the eluate tested neutral. The total eluate was concentrated to dryness in vacuo, the residue was dissolved in aqueous methanol, and the solution was distilled at atmospheric pressure until all of the methanol had been removed. The residue was distilled in vacuo (about 1 mm.). The distillate was treated with alcoholic picric acid, and the picrate which formed was recrystallized from ethanol, giving a sample with the M. P. 193–194° C. (dec.).

*Analysis.*—Calcd. for the dipicrate of 1-[(2-dimethylaminobenzyl)vinylamino]-3-dimethylamino - 5 - cycloheptene; C$_{20}$H$_{31}$N$_3$.2C$_6$H$_3$N$_3$O$_7$: C, 50.21; H, 4.60; N, 5.32.  Found: C, 49.8; H, 4.83; N, 5.44.

1-methyl-4-(3-tropanyl)-1,2,4,5-tetrahydro - 1,4 - benzodiazepine bisethiodide was prepared from 11.6 g. of the free base and 14 g. of ethyl iodide in 100 ml. of ethanol. The bisethiodide had the M. P. 208–210° C.

*Analysis.*—Calcd. for C$_{22}$H$_{37}$I$_2$N$_3$: I, 42.5; N, 7.03.  Found: I, 42.8; N, 7.12.

*Example 72*

3-(2-phenylethylaminoethylamino)tropane [I; Y=NH, n=2, m=1, R=CH$_3$, N=B=N(C$_2$H$_5$)(C$_6$H$_5$)] was prepared from 51.9 g. of N-ethyl-N-phenylethylenediamine, B. P. 97–99° C. (0.2 mm.), n$_D^{25}$=1.5625, prepared by condensation of N-(2-bromoethyl)phthalimide and N-ethylaniline] and 48.5 g. of 3-tropanone according to the manipulative procedure described in Example 1. There was thus obtained 78 g. of 3-(2-phenylethylaminoethylamino)tropane, B. P. 174–177° C. (0.6 mm.).

*Example 73*

3 - (2 - phenylethylaminoethylamino)tropane 8-methiodide.—A solution of 3 g. of 3-(2-phenylethylaminoethylamino)tropane in 25 cc. of ethanol was treated with 3 cc. of methyl iodide. The crystalline material which separated was collected by filtration and recrystallized first from ethanol and then from methanol, giving 3-(2-phenylethylaminoethylamino)tropane 8-methiodide, M. P. 226–228° C. (dec.).

*Analysis.*—Calcd. for C$_{19}$H$_{32}$IN$_3$: N, 9.79; I, 29.6.  Found: N, 9.75; I, 29.2.

*Example 74*

1-ethyl-4-(3-tropanyl)-1,2,4,5-tetrahydro - 1,4 - benzodiazepine [V; R'=C$_2$H$_5$, m=1, R=CH$_3$, R''=H] was prepared from 31.2 g. of 3-(2-phenylethylaminoethylamino)tropane (Example 72), 28.1 ml. of formic acid and 10.9 ml. of 37% formaldehyde according to the manipulative procedure described in Example 70. The product was distilled giving 17.6 g. of 1-ethyl-4-(3-tropanyl)-1,2,4,5-tetrahydro-1,4-benzodiazepine, B. P. 174–178° C. (0.5 mm.).

*Example 75*

1 - ethyl - 4 - (3 - tropanyl) - 1,2,4,5 - tetrahydro - 1,4-benzodiazepine bismethiodide was prepared from 15.5 g. of 1-ethyl-4-(3-tropanyl)-1,2,4,5-tetrahydro-1,4-benzodiazepine and 16 g. of methyl iodide in 75 ml. of ethanol. The total crystalline product was leached with ethanol and the undissolved portion was recrystallized from water, giving 2 g. of 1-ethyl-4-(3-tropanyl)-1,2,4,5-tetrahydro-1,4-benzodiazepine bismethiodide, M. P. 269–271° C.

*Analysis.*—Calcd. for C$_{21}$H$_{35}$N$_3$I$_2$: N, 7.20; I, 43.51.  Found: N, 7.22; I, 43.2.

1 - ethyl - 4 - (3 - tropanyl) - 1,2,4,5 - tetrahydro-1,4-benzodiazepine bismethiodide was found to be about 3.5 and 1.5 times as effective as hexamethonium bromide in blockade of the parasympathetic and sympathetic ganglia, respectively, as measured by the carotid occlusion test in dogs.

*Example 76*

1 - ethyl - 4 - (3 - tropanyl) - 1,2,4,5 - tetrahydro - 1,4-benzodiazepine 8-methiodide.—The ethanol soluble portion from the preparation of the bismethiodide in Example 75 was concentrated and the residue was recrystallized from ethanol, giving 6.0 g. of 1-ethyl-4-(3-tropanyl)-1,2,4,5-tetrahydro-1,4-benzodiazepine 8-methiodide, M. P. 235–238° C.

*Analysis.*—Calcd. for C$_{20}$H$_{32}$IN$_3$: N, 9.52; I, 28.6.  Found: N, 9.51; I, 28.6.

*Example 77*

1 - ethyl - 4 - (3 - tropanyl) - 1,2,4,5 - tetrahydro - 1,4-benzodiazepine bismethobromide was prepared from 20 g. of 1-ethyl-4-(3-tropanyl)-1,2,4,5-tetrahydro-1,4-benzodiazepine and an excess (20 g.) of methyl bromide in 80 ml. of methanol. The product which separated (9.5 g.) was collected by filtration and recrystallized from aqueous methanol, giving 1-ethyl-4-(3-tropanyl)-1,2,4,5-tetrahydro-1,4-benzodiazepine bismethobromide, M. P. 262–262.5° C. (dec.).

*Analysis.*—Calcd. for C$_{21}$H$_{35}$Br$_2$N$_3$: N, 8.58; Br, 32.6.  Found: N, 8.58; Br, 32.4.

*Example 78*

1 - ethyl - 4 - (3 - tropanyl) - 1,2,4,5 - tetrahydro - 1,4-benzodiazepine bisethiodide.—A solution of 3 g. of 1-ethyl - 4 - (3 - tropanyl) - 1,2,4,5 - tetrahydro - 1,4 - benzodiazepine in 10 cc. of acetonitrile was treated with 3 cc. of ethyl iodide. The crystalline material which separated was collected by filtration and recrystallized from water, giving 1-ethyl-4-(3-tropanyl)-1,2,4,5-tetrahydro-1,4-benzodiazepine bisethiodide, M. P. 253–254° C. (dec.).

*Analysis.*—Calcd. for C$_{23}$H$_{39}$I$_2$N$_3$: N, 6.89; I, 41.6.  Found: N, 6.83; I, 41.2.

Example 79

(a) *8-benzylnortropanone.*—2,5-diethoxytetrahydrofuran (160 g.) was suspended in 150 cc. of water and 0.13 cc. of concentrated hydrochloric acid was added. The suspension was stirred at 48–50° C. for two hours, cooled to 25° C., and 202 g. of ethyl acetonedicarboxylate was added followed by 100 cc. of water and benzylamine hydrochloride prepared from 107 g. of benzylamine and 83 cc. of concentrated hydrochloride acid. The reaction mixture was stirred overnight, treated with 250 cc. of hydrochloric acid, and heated and stirred during which time water was slowly distilled off. After five and one-half hours 270 cc. of water had been distilled off, the temperature had risen from 90 to 103° C., and the reaction mixture was then filtered, the filtrate was made basic with 250 cc. of 35% sodium hydroxide, 500 g. of potassium carbonate was added and the mixture was extracted three times with ether. The ether extracts were dried over anhydrous calcium sulfate, concentrated, and the residue distilled. The fraction boiling at 146–153° C. (0.8 mm.) (102 g.) was redistilled, giving 8-benzylnortropanone, B. P. 134–137° C. (0.4 mm.), $n_D^{25}$=1.5526.

(b) *3 - (2 - diethylaminoethylamino) - 8 - benzylnortropane* [I; Y=NH, n=2, m=1, R=$C_6H_5CH_2$, N=B=N$(C_2H_5)_2$] was prepared from 20.5 g. of 8-benzylnortropanone, 11.6 g. of 2-diethylaminoethylamine and 0.5 g. of platinum oxide catalyst according to the manipulative procedure described above in Example 1. There was thus obtained 24.8 g. of 3-(2-diethylaminoethylamino)-8-benzylnortropane, B. P. 161–168° C. (0.25 mm.), $n_D^{25}$=1.5235.

Example 80

*3 - (2 - diethylaminoethylamino) - 8 - benzylnortropane trihydrochloride.*—A solution of 4.0 g. of 3-(2-diethylaminoethylamino)-8-benzylnortropane in 10 cc. of ethanol was treated with an excess of ethanolic hydrogen chloride. The crystalline material which separated was collected by filtration and recrystallized twice from methanol, giving 3-(2-diethylaminoethylamino)-8-benzylnortropane trihydrochloride, M. P. 264–266° C. (dec.).

*Analysis.*—Calcd. for $C_{20}H_{33}N_3.3HCl$: Cl, 25.03; N, 9.89. Found: Cl, 24.97; N, 9.88.

Example 81

*3 - (2 - diethylaminoethylamino) - 8 - benzylnortropane bismethiodide.*—3 - (2 - diethylaminoethylamino)-8-benzylnortropane (obtained by neutralization of 15 g. of its hydrochloride salt) was dissolved in 40 ml. of acetonitrile and 10 ml. of absolute ethanol, and the solution was treated with 15.0 ml. of methyl iodide. The crystalline material which separated was collected by filtration and recrystallized from methanol, giving 8.0 g. of 3-(2-diethylaminoethylamino)-8-benzylnortropane bismethiodide, M. P. 255–257° C.

*Analysis.*—Calcd. for $C_{22}H_{39}N_3I_2$: N, 7.01; I, 42.35. Found: N, 6.90; I, 42.20.

Example 82

(a) *8-(4-methoxybenzyl)nortropanone* was prepared from 32 g. of 3,5-diethoxytetrahydrofuran, 40.5 cc. of ethyl acetonedicarboxylate and 27.4 g. of p-methoxybenzylamine according to the manipulative procedure given above in Example 79, part *a*. The product boiling at 162–180° C. (0.1 mm.) was collected and redistilled, giving 8-(4-methoxybenzyl)nortropanone, B. P. 179–184° C. (0.1 mm.), $n_D^{25}$=1.5538. The latter base was converted to the hydrochloride salt by adding an excess of 4 N ethanolic hydrogen chloride. The hydrochloride salt had the M. P. 203–204° C. (dec.) when recrystallized from ethanol.

(b) *3 - (2 - diethylaminoethylamino) - 8 - (4 - methoxybenzyl)nortropane* [I; Y=NH, n=2, m=1, R=4-$CH_3OC_6H_4CH_2$, N=B=N$(C_2H_5)_2$] was prepared from 8-(4-methoxybenzyl)nortropanone (obtained from neutralization of 6.68 g. of its hydrochloride salt), 3.0 g. of 2-diethylaminoethylamine and 0.5 g. of platinum oxide catalyst according to the manipulative procedure given above in Example 1.

Example 83

*3 - (2 - diethylaminoethylamino) - 8 - (4 - methoxybenzyl)nortropane trihydrochloride.*—The crude 3-(2-diethylaminoethylamino) - 8 - (4 - methoxybenzyl)nortropane obtained above in Example 82, part *b*, was dissolved in 25 ml. of ethanol and treated with an excess of ethanolic hydrogen chloride. The crystalline product which separated was collected by filtration and recrystallized from methanol, giving 6.5 g. of 3-(2-diethylaminoethylamino)-8-(4-methoxybenzyl)nortropane trihydrochloride, M. P. 277–278° C. (dec.).

*Analysis.*—Calcd. for $C_{21}H_{35}N_3O.3HCl$: C, 55.44; H, 8.42; N, 9.24. Found: C, 55.68; H, 8.51; N, 9.28.

Example 84

*3 - (2 - diethylaminoethylamino)-8-(4-methoxybenzyl)-nortropane bismethiodide.*—3 - (2 - diethylaminoethylamino)-8-(4-methoxybenzyl)nortropane (obtained by neutralization of 9.0 g. of its hydrochloride salt) in 50 cc. of acetonitrile was treated with 7.5 cc. of methyl iodide. The crystalline material which separated (8.2 g.) was collected by filtration and recrystallized from methanol, giving 3-(2-diethylaminoethylamino)-8-(4-methoxybenzyl)nortropane bismethiodide, M. P. 229–230° C.

*Analysis.*—Calcd. for $C_{23}H_{41}I_2N_3O$: N, 6.51; I, 39.3. Found: N, 6.68; I, 40.0.

Example 85

(a) *8-(2,3-dimethoxybenzyl)nortropanone* was prepared from 40 g. of 2,5-diethoxytetrahydrofuran, 50 g. of ethyl acetonedicarboxylate and 42 g. of 2,3-dimethoxybenzylamine according to the manipulative procedure given above in Example 79, part *a*. There was thus obtained 28.5 g. of 8-(2,3-dimethoxybenzyl)nortropanone, B. P. 178–199° C. (0.5 mm.), which was converted to its hydrochloride salt, M. P. 201–202° C. (dec.).

(b) *3 - (2-diethylaminoethylamino)-8-(2,3-dimethoxybenzyl)nortropane* [I; Y=NH, n=2, m=1, R=2,3-$(CH_3O)_2C_6H_3CH_2$, N=B=N$(C_2H_5)_2$] was prepared from 8-(2,3-dimethoxybenzyl)nortropanone (obtained by neutralization of 16.2 g. of its hydrochloride salt), 7.0 g. of 2-diethylaminoethylamine and 1.0 g. of platinum oxide catalyst according to the manipulative procedure described above in Example 1.

Example 86

*3 - (2 - diethylaminoethylamino)-8-(2,3-dimethoxybenzyl)nortropane trihydrochloride.*—The crude 3-(2-diethylaminoethylamino) -8- (2,3 - dimethoxybenzyl)nortropane, obtained above in Example 85, part *b*, was treated with an excess of ethanolic hydrogen chloride. The crystalline product which separated was collected by filtration and recrystallized from ethanol, giving 14 g. of 3-(2-diethylaminoethylamino)-8-(2,3 - dimethoxybenzyl)nortropane trihydrochloride, M. P. 234–237° C.

*Analysis.*—Calcd. for $C_{22}H_{37}N_3O_2.3HCl$: C, 54.55; H, 8.32; Cl, 21.97. Found: C, 54.35; H, 8.03; Cl, 21.93.

Example 87

*3 - (2 - diethylaminoethylamino)-8-(2,3-dimethoxybenzyl)nortropane bismethiodide.*—3 - (2-diethylaminoethylamino) - 8 - (2,3-dimethoxybenzyl)nortropane (obtained by neutralization of 7.2 g. of its hydrochloride salt) was dissolved in 15 ml. of acetonitrile and treated with 6 ml. of methyl iodide. The crystalline material which separated (5.8 g.) was collected by filtration and recrystallized first from ethanol and then from methanol, giving 3-(2 - diethylaminoethylamino)-8-(2,3-dimethoxybenzyl)-nortropane bismethiodide, M. P. 226–228° C.

Analysis.—Calcd. for $C_{24}H_{43}I_2N_3O_2$: N, 6.37; I, 38.50. Found: N, 6.49; I, 38.40.

Example 88

(a) 8 - (3,4 - methylenedioxybenzyl)nortropanone was prepared from 40 g. of 2,5-diethoxytetrahydrofuran, 50 g. of ethyl acetonedicarboxylate and 38 g. of 3,4-methylenedioxybenzylamine according to the manipulative procedure described above in Example 79, part a. In this case the hydrochloride salt separated directly from the crude reaction mixture and was collected and recrystallized from water, giving 31 g. of 8-(3,4-methylenedioxybenzyl)nortropane trihydrochloride, M. P. 223–223.5° C. (dec.).

(b) 3 - (2 - diethylaminoethylamino)-8-(3,4-methylenedioxybenzyl)nortropane [I; Y=NH, $n=2$, $m=1$, R=3,4-$CH_2O_2C_6H_3CH_2$, N=B=N$(C_2H_5)_2$] was prepared from 8-(3,4-methylenedioxybenzyl)nortropane (obtained from 14.8 g. of its hydrochloride salt by treatment with 2.8 g. of potassium hydroxide and extraction), 7.0 g. of 2-diethylaminoethylamine and 1.0 g. of platinum oxide catalyst according to the manipulative procedure described above in Example 1.

Example 89

3-(2 - diethylaminoethylamino)-8-(3,4-methylenedioxybenzyl)nortropane trihydrochloride.—The crude 3-(2-diethylaminoethylamino) - 8 - (3,4-methylenedioxybenzyl)-nortropane obtained above in Example 88, part b, was treated with an excess of ethanolic hydrogen chloride. There was thus obtained 21.2 g. of 3-(2-diethylaminoethylamino)-8-(3,4-methylenedioxybenzyl)nortropane trihydrochloride, M. P. 275–276° C. (dec.) when recrystallized from methanol.

Analysis.—Calcd. for $C_{21}H_{33}N_3O_2 \cdot 3HCl$: C, 53.8; H, 7.75. Found: C, 53.6; H, 7.47.

Example 90

3-(2 - diethylaminoethylamino)-8-(3,4-methylenedioxybenzyl)nortropane bismethiodide.—A solution of 7.0 g. of 3-(2-diethylaminoethylamino)-8-(3,4-methylenedioxybenzyl)nortropane in 20 cc. of acetonitrile was treated with 6 ml. of methyl iodide. The crystalline material which separated was collected by filtration and recrystallized from methanol, giving 3.8 g. of 3-(2-diethylaminoethylamino)-8-(3,4-methylenedioxybenzyl)nortropane bismethiodide, M. P. 234–237° C.

Analysis.—Calcd. for $C_{23}H_{39}I_2N_3O_2$: N, 6.53; I, 39.45. Found: N, 6.43; I, 39.40.

Example 91

(a) 8 - (4 - chlorobenzyl)nortropanone was prepared from 40 g. of 2,5-diethoxytetrahydrofuran, 50 g. of ethyl acetonedicarboxylate and 44.5 g. of 4-chlorobenzylamine hydrochloride according to the manipulative procedure described above in Example 79, part a. There was thus obtained 21 g. of 8-(4-chlorobenzyl)nortropanone, B. P. 168–180° C. (0.8 mm.) which was converted to its hydrochloride salt and recrystallized from ethanol and isopropyl alcohol.

(b) 3-(2-diethylaminoethylamino)-8-(4-chlorobenzyl)-nortropane [I; Y=NH, $n=2$, $m=1$, R=4-ClC$_6$H$_4$CH$_2$, N=B=N$(C_2H_5)_2$] was prepared from 8-(4-chlorobenzyl)nortropanone (obtained by neutralization of 9.0 g. of its hydrochloride salt), 6 g. of 2-diethylaminoethylamine and 0.5 g. of platinum oxide catalyst according to the manipulative procedure described above in Example 1.

Example 92

3-(2 - diethylaminoethylamino) - 8 - (4-chlorobenzyl)-nortropane trihydrochloride.—The crude 3-(2-diethylaminoethylamino) - 8 - (4 - chlorobenzyl)nortropane obtained above in Example 91, part b, was treated with an excess of ethanolic hydrogen chloride. The crystalline product which separated (8.72 g.) was collected by filtration and recrystallized from ethanol, giving 3-(2-diethylaminoethylamino) - 8 - (4-chlorobenzyl)nortropane trihydrochloride, M. P. 273–275° C.

Analysis.—Calcd. for $C_{20}H_{32}ClN_3 \cdot 3HCl$: C, 52.30; H, 7.68; N, 9.15. Found: C, 51.93; H, 7.96; N, 9.10.

Example 93

(a) 8-(2-chlorobenzyl)nortropanone was prepared from 40 g. of 2,5-diethoxytetrahydrofuran, 50 g. of ethyl acetonedicarboxylate and 44.5 g. of 2-chlorobenzylamine hydrochloride according to the manipulative procedure described above in Example 79, part a. The crude hydrochloride salt (29.7 g.) separated directly and was recrystallized from water, giving 8-(2-chlorobenzyl)nortropanone hydrochloride, M. P. 211–213° C. (dec.).

(b) 3-(2-diethylaminoethylamino)-8-(2-chlorobenzyl)-nortropane [I; Y=NH, $n=2$, $m=1$, R=2-ClC$_6$H$_4$CH$_2$, N=B=N$(C_2H_5)_2$] was prepared from 8-(2-chlorobenzyl)nortropanone (obtained from 21.4 g. of its hydrochloride salt), 11.6 g. of 2-diethylaminoethylamine and 0.6 g. of platinum oxide catalyst according to the manipulative procedure described above in Example 1. The crude free base was converted to its trihydrochloride salt (25.1 g.) which was recrystallized from absolute ethanol.

Example 94

3 - (2 - diethylaminoethylamino) - 8 - (2 - chlorobenzyl)nortropane bismethiodide.—A solution of 3-(2-diethylaminoethylamino) - 8 - (2 - chlorobenzyl)nortropane (obtained by neutralization of 9.2 g. of its hydrochloride salt) in 50 cc. of acetonitrile and 10 cc. of ethanol was treated with 6 cc. of methyl iodide. The crystalline material which separated was recrystallized from methanol, giving 3-(2-diethylaminoethylamino)-8-(2-chlorobenzyl)nortropane bismethiodide, M. P. 232–234° C.

Analysis.—Calcd. for $C_{22}H_{38}ClI_2N_3$: N, 6.63; I, 40.1. Found: N, 6.61; I, 39.7.

A mixture of 2.59 g. of 3-(2-diethylaminoethylamino)-8-(2-chlorobenzyl)nortropane bismethiodide, 6 g. of silver bromide and 50 cc. of water was shaken for one hour and then stirred for one hour at 70° C. The mixture was filtered, the filtrate was concentrated to dryness and the residue was dried azeotropically with benzene. The residue was dissolved in absolute ethanol and the solution was again concentrated. The crystalline residue was recrystallized from an ethanol-acetone mixture and dried at 70° C. at 50 mm. for two hours, giving 1.15 g. of 3 - (2 - diethylaminoethylamino) - 8 - (2 - chlorobenzyl) nortropane bismethobromide, M. P. 228–230.5° C.

Example 95

(a) 8-(2-methoxybenzyl)nortropanone was prepared from 40 g. of 2,5-diethoxytetrahydrofuran, 50 g. of ethyl acetonedicarboxylate and 34.5 g. of 2-methoxybenzylamine according to the manipulative procedure described above in Example 7, part a. There was thus obtained 30.5 g. of 8-(2-methoxybenzyl)nortropanone, B. P. 174–181° C. (0.2–0.5 mm.), $n_D^{25}=1.5061$–5. The latter was converted to its hydrochloride salt having the M. P. 177–178° C. (dec.).

(b) 3 - (2 - diethylaminoethylamino) - 8 - (2 - methoxybenzyl)nortropane [I; Y=NH, $n=2$, $m=1$, R=2-CH$_3$OC$_6$H$_4$CH$_2$, N=B=N$(C_2H_5)_2$] was prepared from 8-(2-methoxybenzyl)nortropanone (obtained by neutralization of 19.7 g. of its hydrochloride salt), 11.6 g. of 2-diethylaminoethylamine and 0.7 g. of platinum oxide catalyst according to the manipulative procedure given above in Example 1.

Example 96

3 - (2 - diethylaminoethylamino) - 8 - (2 - methoxybenzyl)nortropane trihydrochloride.—The crude 3-(2- diethylaminoethylamino) - 8 - (2 - methoxybenzyl)nortropane (obtained above in Example 95, part *b*) was treated with an excess of ethanolic hydrogen chloride. There was thus obtained 15.4 g. of 3-(2-diethylaminoethylamino) - 8 - (2-methoxybenzyl)nortropane trihydrochloride, M. P. 248–251° C. when recrystallized from ethanol.

*Example 97*

*3 - (2 - diethylaminoethylamino) - 8 - (2 - methoxybenzyl)nortropane bismethiodide.*—A solution of 3-(2-diethylaminoethylamino) - 8 - (2 - methoxybenzyl)nortropane (obtained by neutralization of 9.3 g. of its hydrochloride salt) in 50 cc. of acetonitrile was treated with 4 cc. of methyl iodide. The crystalline material which separated was collected by filtration and recrystallized from methanol, giving 4.5 g. of 3-(2-diethylaminoethylamino)-8-(2-methoxybenzyl)nortropane bismethiodide, M. P. 218.5–221.5° C.

*Analysis.*—Calcd. for $C_{23}H_{41}I_2N_3O$: N, 6.51; I, 39.3. Found: N, 6.52; I, 40.2.

*Example 98*

(*a*) *8-phenylnortropanone.*—A solution was prepared from 36.2 g. of 2,5-diethoxytetrahydrofuran in 240 cc. of water containing 0.6 ml. of concentrated sulfuric acid. A second solution was prepared from 97 g. of acetonedicarboxylic acid, 146 g. of sodium acetate trihydrate and 27 g. of aniline in 3.5 liters of water. The first solution was warmed on a steam bath for fifteen minutes, cooled and added to the second solution. The reaction mixture was kept overnight, and the solid which separated was collected by filtration and dissolved in 1 liter of 5% hydrochloric acid at 60° C. The solution was cooled, made basic with ammonia and the product collected by filtration and recrystallized from dilute methanol, giving 11.4 g. of 8-phenylnortropanone, M. P. 107–109° C.

(*b*) *3 - (2 - diethylaminoethylamino) - 8 - phenylnortropane*

[I; Y=NH, *n*=2, *m*=1, R=$C_6H_5$, N=B=N($C_2H_5$)$_2$]

was prepared from 10.0 g. of 8-phenylnortropanone, 6.4 g. of 2-diethylaminoethylamine, and 1 g. of platinum oxide catalyst according to the manipulative procedure described above in Example 1. There was thus obtained 13.0 g. of 3-(2-diethylaminoethylamino)-8-phenylnortropane, B. P. 153–168° C. (0.2 mm.).

*Example 99*

*3 - [(2 - diethylaminoethyl)methylamino] - 8 - phenylnortropane* [I; Y=N(CH$_3$), *n*=2, *m*=1, R=$C_6H_5$, N=B=N($C_2H_5$)$_2$] was prepared from 12.5 g. of 3-(2-diethylaminoethylamino)-8-phenylnortropane, 10 cc. of formic acid and 5 cc. of 36% formaldehyde solution according to the manipulative procedure described above in Example 11.

*Example 100*

(*a*) *3 - [2 - (1 - piperidyl)ethylimino] - 9 - methylgranatanine.*—A mixture of 29.8 g. of pseudopelletierine (hydrated), 26.0 g. of 2-(1-piperidyl)ethylamine, 600 mg. of zinc chloride and 150 ml. of toluene was refluxed for sixty-four hours using a water separator to collect the water formed in the reaction. The reaction mixture was cooled, washed with 50 ml. of saturated potassium carbonate solution, the aqueous layer extracted with four 50 ml. portions of benzene, and the total organic material concentrated and distilled. The fraction boiling at 150–200° C. (0.5–1.5 mm.) was collected and redistilled giving 27.8 g. of 3-[2-(1-piperidyl)ethylimino]-9-methylgranatanine, B. P. 164–176° C. (1.0 mm.), $n_D^{25}$=1.5235.

(*b*) *1 - [2 - (1 - piperidyl)ethyl] - 1 - [3 - (9 - methyl)granatanyl]-3-phenylthiourea (isomers A and B)* [I; Y=N(CSNHC$_6$H$_5$), *n*=2, *m*=2, R=CH$_3$, N=B=NC$_5$H$_{10}$].—A solution of 27.8 g. of 3-[2-(1-piperidyl)-ethylimino]-9-methylgranatanine in 40.0 g. of 4-methyl-2-pentanol was added over a period of two hours to a suspension of 9.2 g. of sodium powder in 200 ml. of toluene. The reaction mixture was refluxed and stirred for thirty minutes, kept overnight and then warmed to about 90° C. while 30 ml. of water was slowly added to destroy excess sodium. The mixture was cooled, the layers were separated, the aqueous layer was saturated with potassium carbonate and extracted with three 100 ml. portions of toluene. The combined toluene layers were concentrated and the residue containing a mixture of isomers of 3-[2-(1-piperidyl)ethylamino]-9-methylgranatanine was dissolved in 50 ml. of methanol. To the latter solution was slowly added 15.0 g. of phenylisothiocyanate. The solid material which formed was collected by filtration, 34.4 g., M. P. 158–162° C. after recrystallization from ethyl acetate. By fractional crystallization from methanol two isomers of 1-[2-(1-piperidyl) ethyl] - 1 - [3 - (9 - methyl)granatanyl] - 3 - phenylthiourea were isolated. The more soluble isomer (Isomer A) was obtained in the form of prisms, M. P. 174.5–176° C. after recrystallization from ethyl acetate. The more sparingly soluble isomer (Isomer B) was obtained in the form of needles, M. P. 173–174.5° C. A mixture of the two isomers showed a depression in melting point.

*Analysis.*—(Isomer A) Calcd. for $C_{23}H_{36}N_4S$: S, 8.00; N, 13.95. Found: S, 8.12; N, 14.06. (Isomer B) Found: S, 8.30; N, 14.03.

*Example 101*

*3 - [2 - (1 - piperidyl)ethylamino] - 9 - methylgranatanine trihydrochloride (Isomer A)* [I; Y=NH, *n*=2, *m*=2, R=CH$_3$, N=B=NC$_5$H$_{10}$].—1 - [2-(1-piperidyl) ethyl] - 1 - [3 - (9 - methyl)granatanyl] - 3 - phenylthiourea (isomer A, M. P. 174.5–176° C.) (7.3 g.) was dissolved in 100 ml. of methanol containing 25 ml. of 4 N hydrogen chloride in ethanol. The solid was then removed in vacuo, the residue heated thirty minutes at 100° C., dissolved in 50 ml. of ethanol, and the product was allowed to crystallize. The material was collected by filtration, washed with 25 ml. of absolute ethanol and dried at 70° C. for six hours and then at 100° C. (0.3 mm.) overnight. There was thus obtained 4.7 g. of 3 - [ - 2 - (1 - piperidyl)ethylamino] - 9 - methylgranatanine trihydrochloride (Isomer A), M. P. 285–287° C. (dec.).

*Analysis.*—Calcd. for $C_{16}H_{31}N_3$·3HCl: C, 51.27; H, 9.14; Cl, 28.4. Found: C, 51.67; H, 9.27; Cl, 28.3.

*Example 102*

*3 - [2 - (1 - piperidyl)ethylamino] - 9 - methylgranatanine trihydrochloride (Isomer B)* was prepared from 9.0 g. of 1 - [2 - (1 - piperidyl)ethyl] - 1 - [3 - (9-methyl)granatanyl] - 3 - phenylthiourea (Isomer B, M. P. 173–174.5° C.) according to the manipulative procedure described above in Example 101. The material thus obtained was recrystallized from 4 - methyl - 2-pentanol, giving 6.8 g. of 3-[2-(1-piperidyl)ethylamino]-9-methylgranatanine trihydrochloride (Isomer B), M. P. 276° C. (dec.).

*Example 103*

*1 - (2 - diethylaminoethyl) - 1 - (3 - tropanyl) - 3-phenylthiourea* [I; Y=N(CSNHC$_6$H$_5$, *n*=2, *m*=1, R=CH$_3$, N=B=N($C_2H_5$)$_2$].—A solution of 3.8 g. of 3 - (2 - diethylaminoethylamino)tropane (prepared by catalytic hydrogenation as described in Example 1) in methanol was treated with 2.2 g. of phenylisothiocyanate. The product which separated was recrystallized first from ethanol and then from ethyl acetate, giving 3.7 g. of 1 - (2 - diethylaminoethyl) - 1 - (3 - tropanyl)-3-phenylthiourea, M. P. 170.5–172° C.

*Analysis.*—Calcd. for $C_{21}H_{34}N_4S$: N, 14.96; S, 8.56. Found: N, 14.95; S, 8.29.

Example 104

(a) 3 - (2 - diethylaminoethylimino)tropane was prepared from 69.5 g. of tropanone, 63.8 g. of 2-diethylaminoethylamine and 500 mg. of zinc chloride according to the manipulative procedure described above in Example 100, part a. There was thus obtained 92.2 g. of 3 - ( 2 - diethylaminoethylimino)tropane, B. P. 117–131° C. (0.6 mm.).

(b) 3 - (2 - diethylaminoethylamino)tropane was obtained as a mixture of isomers from 47.4 g. of 3-(2-diethylaminoethylimino)tropane, 22.0 g. of sodium and 375 ml. of absolute ethanol according to the manipulative procedure described above in Example 100, part b.

(c) 1 - (2 - diethylaminoethyl) - 1 - (3 - pseudotropanyl) - 3 - phenylthiourea.—A methanol solution of 1 cc. of the mixture of isomers of 3-(2-diethylaminoethylamino)tropane, obtained in part b above, was treated with an excess of phenylisothiocyanate. The product was fractionally crystallized from ethyl acetate, and there were obtained two compounds, M. P. 169–172° C., identical with the 1-(2-diethylaminoethyl)-1-(3-tropanyl)-3-phenylthiourea obtained above in Example 103, and the stereoisomeric 1 - ( 2 - diethylaminoethyl) - 1 - (3-pseudotropanyl)-3-phenylthiourea, M. P. 138–139.5° C.

Analysis.—Calcd. for $C_{21}H_{34}N_4S$: N, 14.96; S, 8.46. Found: N, 15.06; S, 8.38.

Example 105

3 - (2 - diethylaminoethylamino)pseudotropane trihydrochloride was prepared by hydrolysis of 11.7 g. of 1-(2 - diethylaminoethyl) - 1 - (3 - pseudotropanyl) - 3-phenylthiourea according to the manipulative procedure described above in Example 101. The compound had the M. P. 276° C. (dec.).

Analysis.—Calcd. for $C_{14}H_{29}N_3\cdot 3HCl$: Cl, 30.50; C, 48.3; H, 9.22. Found: Cl, 30.05; C, 48.0; H, 9.33.

Example 106

3 - (2 - diethylaminoethylamino)pseudotropane bismethiodide.—A solution of 2.4 g. of 3 - (2 - diethylaminoethylamino)pseudotropane in 50 ml. of ethanol was treated with 2.0 cc. of methyl iodide. The crystalline material which separated (3.0 g.) was recrystallized from methanol, giving 3 - (2-diethylaminoethylamino)pseudotropane bismethiodide, M. P. 279–281° C.

Analysis.—Calcd. for $C_{16}H_{35}I_2N_3$: N, 8.03; I, 48.5. Found: N, 8.09; I, 48.4.

Example 107

(a) 3 -[2 - (1 - pyrrolidyl)ethylimino] - 9 - methylgranatanine was prepared from 13.8 g. of pseudopelletierine, 10.5 g. of 2-(1-pyrrolidyl)ethylamine and 300 mg. of zinc chloride according to the manipulative procedure described above in Example 100, part a. There was thus obtained 12.0 g. of 3-[2-(1-pyrrolidyl)ethylimino] - 9 - methylgranatanine, B. P. 144–146° C. (1.0 mm.), $n_D^{24}=1.5252$.

(b) 3 - [2 - (1 - pyrrolidyl)ethylamino] - 9 - methylgranatanine [I; Y=NH, $n=2$, $m=2$, R=CH$_3$, N=B =NC$_4$H$_8$] was prepared by catalytic hydrogenation of 3 - [2 - (1 - pyrrolidyl)ethylimino] - 9 - methylgranatanine obtained above in part a in 200 ml. of ethanol with platinum oxide catalyst. There was thus obtained 8.5 g. of 3 - [2 - (1 - pyrrolidyl)ethylamino] - 9 - methylgranatanine, B. P. 155–157° C. (2mm.), $n_D^{25}=1.5102$.

Example 108

1-[2-(1-pyrrolidyl)ethyl]-1-[3-(9-methyl)granatanyl]-3-phenylthiourea.—A solution of 1.25 g. of 3-[2-(1-pyrrolidyl)-ethylamino]-9-methylgranatanine in methanol was treated with 0.75 g. of phenylisothiocyanate. The product which separated was recrystallized from ethyl acetate, giving 1-[2-(1-pyrrolidyl)ethyl]-1-[3-(9-methyl)-granatanyl]-3-phenylthiourea, M. P. 173–174° C.

Analysis.—Calcd. for $C_{22}H_{34}N_4S$: S, 8.29; N, 14.51. Found: S, 8.02; N, 14.49.

Example 109

3-[2-(1-pyrrolidyl)ethylamino] - 9 - methylgranatanine bismethiodide.—A solution of 2.5 g. of 3-[2-(1-pyrrolidyl)-ethylamino]-9-methylgranatanine in 10 ml. of methanol was treated with 1.2 cc. of methyl iodide. The product which separated was recrystallized from methanol, giving 1.3 g. of 3-[2-(1-pyrrolidyl)ethylamino]-9-methylgranatanine bismethiodide, M. P. 278° C. (dec.).

Analysis.—Calcd. for $C_{17}H_{33}I_2N_3$: I, 47.4; N, 7.85. Found: I, 47.0; N, 7.89.

3-[2-(1-pyrrolidyl)ethylamino] - 9 - methylgranatanine bismethiodide was found to have a ganglionic blocking activity about 2.1 times that of hexamethonium bromide when measured by its effect on the nictitating membrane of the cat. It was about 1.04 times as effective as hexamethonium bromide in blockade of the sympathetic ganglia when measured by the carotid occlusion test in dogs.

Example 110

(a) 3-(2-diethylaminoethylimino)-9-methylgranatanine was prepared from 15.7 g. of pseudopelletierine and 12.0 g. of 2-diethylaminoethylamine according to the manipulative procedure described above in Example 100, part a. The material boiling at 120–135° C. (0.5-1.0 mm.) was collected and redistilled, giving 10.5 g. of 3-(2-diethylaminoethylimino)-9-methylgranatanine, B. P. 131–139° C. (0.7 mm.), $n_D^{25}=1.5050$.

(b) 3-(2-diethylaminoethylamino)-9-methylgranatanine [I; Y=NH, $n=2$, $m=2$, R=CH$_3$, N=B=N(C$_2$H$_5$)$_2$] was prepared by catalytic hydrogenation of 10.5 g. of 3-(2-diethylaminoethylimino)-9-methylgranatanine in 200 ml. of ethanol in the presence of 0.5 g. of platinum oxide catalyst. The product (8.4 g.) boiling at 116–122° C. (0.2 mm.) was collected and redistilled, giving 3-(2-diethylaminoethylamino)-9-methylgranatanine, B. P. 128–130° C. (0.6 mm.), $n_D^{25}=1.4920$.

Example 111

1 - (2 - diethylaminoethyl) - 1 - (9-methylgranatanyl)-3-phenylthiourea (Isomer B) [I; Y=N(CSNHC$_6$H$_5$), $n=2$, $m=2$, R=CH$_3$, N=B=N(C$_2$H$_5$)$_2$].—A solution of 0.6 g. of 3-(2-diethylaminoethylamino)-9-methylgranatanine, obtained in Example 110, part b above, in 2 cc. of methanol was treated with 0.32 g. of phenylisothiocyanate. The product which separated was recrystallized from ethyl acetate, giving 1-(2-diethylaminoethyl)-1-(9-methylgranatanyl)-3-phenylthiourea (Isomer B), M. P. 188–190° C.

Analysis.—Calcd. for $C_{22}H_{36}N_4S$: S, 8.25; N, 14.42. Found: S, 8.22; N, 14.49.

Example 112

(a) 3-(2-diethylaminoethylamino)-9-methylgranatanine (mixture of isomers) was prepared by reduction of 20.5 g. of 3-(2-diethylaminoethylimino)-9-methylgranatanine (Example 110, part a) with 7.5 g. of sodium and 32.8 g. of 4-methyl-2-pentanol according to the manipulative procedure described above in Example 100, part b.

(b) 1-(2-diethylaminoethyl)-1-(9-methylgranatanyl)-3-phenylthiourea (Isomers A and B).—A solution of the mixture of isomers of 3-(2-diethylaminoethylamino)-9-methylgranatanine, obtained in part a above, in 100 ml. of methanol was treated with 17.5 g. of phenylisothiocyanate. The product which separated was fractionally crystallized from ethyl acetate, giving 20.3 g. of 1-(2-diethylaminoethyl) - 1 - (9 - methylgranatanyl) - 3 - phenylthiourea (Isomer B), M. P. 189–191° C., identical with the compound obtained above in Example 111, and 12.0 g. of 1-(2-diethylaminoethyl)-1-(9-methylgranatanyl)-3-phenylthiourea (Isomer A), M. P. 135–136° C. when recrystallized from ethyl acetate.

*Analysis.*—(Isomer A) Calcd. for $C_{22}H_{36}N_4S$: S, 8.25; N, 14.42. Found: S, 7.96; N, 14.70.

Example 113

3-(2-diethylaminoethylamino)-9-methylgranatanine trihydrochloride (Isomer A) was prepared by hydrolysis of 10.2 g. of 1-(2-diethylaminoethyl)-1-(9-methylgranatanyl)-3-phenylthiourea (Isomer A) with 15 ml. of alcoholic hydrogen chloride in 100 ml. of methanol. The product which separated was recrystallized from an ether-ethanol mixture, giving 3-(2-diethylaminoethylamino)-9-methylgranatanine trihydrochloride (Isomer A), M. P. 278° C. (dec.).

*Analysis*—Calcd. for $C_{15}H_{31}N_3 \cdot 3HCl$: Cl, 29.3; C, 49.65; H, 9.45. Found: Cl, 29.2; C, 49.87; H, 9.54.

Example 114

3-(2-diethylaminoethylamino)-9-methylgranatanine trihydrochloride (Isomer B).—When 1-(2-diethylaminoethyl)-1-(9-methylgranatanyl)-3-phenylthiourea (Isomer B), M. P. 189–191° C., was dissolved in ethanol and alcoholic hydrogen chloride was added, the dihydrochloride, M. P. 205° C. (dec.) of the thiourea derivative precipitated. The latter (6.0 g.) was dissolved in 50 ml. of methanol and treated with 3 cc. of 8 N ethanolic hydrogen chloride. After standing for sixteen days, the methanol solution was concentrated to a 10 ml. volume, and 15 ml. of ethanol and 15 ml. of dry benzene were added. There separated from solution 2.5 g. of 3-(2-diethylaminoethylamino)-9-methylgranatanine trihydrochloride (Isomer B), M. P. 185° C. (dec.).

Example 115

3-(2-diethylaminoethylamino)-9-methylgranatanine bismethiodide (Isomer A).—A solution of 3-(2-diethylaminoethylamino)-9-methylgranatanine (Isomer A) (obtained by neturalization of 2.6 g. of the trihydrochloride salt) in 10 ml. of methanol was treated with 1.2 cc. of methyl iodide. The product which separated (2.3 g.) was recrystallized from methanol, giving 3-(2-diethylaminoethylamino)-9-methylgranatanine bismethiodide (Isomer A), M. P. 277–279° C. (dec.).

*Analysis.*—Calcd. for $C_{17}H_{37}I_2N_3$: I, 47.2; N, 7.82. Found: I, 47.3; N, 7.88.

Example 116

1 - (2 - diethylaminoethyl) - 1 - {3 - [8 - (2 - chlorobenzyl)]nortropanyl}-3-phenylthiourea [I;

$n=2$, $m=1$, $R=2-ClC_6H_4CH_2$, $N=B=N(C_2H_5)_2$] was prepared from 3-(2-diethylaminoethylamino)-8-(2-chlorobenzyl)nortropane (prepared by neutralization of 4.0 g. of the trihydrochloride salt, see Example 93) and 1.2 cc. of phenylisothiocyanate in 40 ml. of ethanol. The product which separated was recrystallized from ethanol, giving 3.4 g. of 1-(2-diethylaminoethyl)-1-{3-[8-(2-chlorobenzyl)]-nortropanyl}-3-phenylthiourea, M. P. 124–126° C.

*Analysis.*—Calcd. for $C_{27}H_{37}ClN_4S$: S, 6.61; $N_{AP}$, 8.66. Found: S, 6.61; $N_{AP}$, 8.70.

Example 117

1 - (2 - diethylaminoethyl) - 1 - (3 - tropanyl) - 3 - allylthiourea [I; $Y=N(CSNHCH_2CH=CH_2)$, $n=2$, $m=1$, $R=CH_3$, $N=B=N(C_2H_5)_2$].—A solution of 4.0 g. of 3-(2-diethylaminoethylamino)tropane in petroleum ether (Skellysolve B) was treated with 1.7 cc. of allylisothiocyanate. The product which separated was recrystallized from petroleum ether, giving 3.6 g. of 1-(2-diethylaminoethyl)-1-(3-tropanyl)-3-allylthiourea, M. P. 97–100° C.

*Analysis.*—Calcd. for $C_{18}H_{34}N_4S$: S, 9.47; $N_{AP}$, 8.27. Found: S, 9.04; $N_{AP}$, 8.24.

Example 118

1 - (2 - diethylaminoethyl) - 1 - (3 - tropanyl) - 3 - ethylthiourea [I; $Y=N(CSNHC_2H_5)$, $n=2$, $m=1$, $R=CH_3$, $N=B=N(C_2H_5)_2$] was prepared from 4.0 g. of 3-(2-diethylaminoethylamino)tropane and 1.5 cc. of ethylisothiocyanate in petroleum ether (Skellysolve B). The product which separated was recrystallized from petroleum ether giving 4.0 g. of 1-(2-diethylaminoethyl)-1-(3-tropanyl)-3-ethylthiourea, M. P. 122–124° C.

*Analysis.*—Calcd. for $C_{17}H_{34}N_4S$: S, 9.82; $N_{AP}$, 12.87. Found: S, 9.67; $N_{AP}$, 12.80.

Example 119

1 - (2 - diethylaminoethyl) - 1 - (3 - tropanyl) - 3 - (4 - ethoxyphenyl)-thiourea [I;

$n=2$, $m=1$, $R=CH_3$, $N=B=N(C_2H_5)_2$] was prepared from 4.0 g. of 3-(2-diethylaminoethylamino)tropane and 3.1 g. of p-ethoxyphenylisothiocyanate in 50 ml. of petroleum ether (Skellysolve B). The reaction mixture was refluxed for five minutes, cooled, and the product which separated was recrystallized from ethanol, giving 6.0 g. of 1-(2-diethylaminoethyl)-1-(3-tropanyl)-3-(4-ethoxyphenyl)-thiourea, M. P. 160–161° C.

*Analysis.*—Calcd. for $C_{23}H_{38}N_4OS$: S, 7.66; $N_{AP}$, 10.41. Found: S, 7.21; $N_{AP}$, 10.02.

Example 120

1 - (2-diethylaminoethyl)-1-[3-(8-benzyl)nortropanyl]-3-phenylthiourea [I; $Y=N(CSNHC_6H_5)$, $n=2$, $m=1$, $R=C_6H_5CH_2$, $N=B=N(C_2H_5)_2$] was prepared from 3-(2 - diethylaminoethylamino) - 8-benzylnortropane (obtained by neutralization of 4.0 g. of its trihydrochloride) (see Example 80) and 1.3 cc. of phenylisothiocyanate in 40 cc. of ethanol. The product which separated was recrystallized from ethanol, giving 1-(2-diethylaminoethyl) - 1 - [3-(8-benzyl)nortropanyl]-3-phenylthiourea, M. P. 138–139° C.

*Analysis.*—Calcd. for $C_{27}H_{38}N_4S$: S, 7.11; $N_{AP}$, 9.33. Found: S, 7.16; $N_{AP}$, 9.33.

Example 121

1 - (2 - diethylaminoethyl)-1-{3-[8-(3,4-methylenedioxybenzyl)]-nortropanyl}-3-phenylthiourea [I;

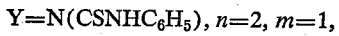 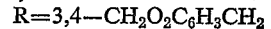

$N=B=N(C_2H_5)_2$] was prepared from 3-(2-diethylaminoethylamino) - 8 - (3,4-methylenedioxybenzyl)nortropane (obtained by neutralization of 4.0 g. of its trihydrochloride salt, see Example 89) and 1.2 cc. of phenylisothiocyanate. The product which separated was recrystallized from ethanol, giving 1-(2-diethylaminoethyl)-1-{3-[8-(3,4-methylenedioxybenzyl)]-nortropanyl} - 3-phenylthiourea, M. P. 148–149° C.

*Analysis.*—Calcd. for $C_{28}H_{38}N_4O_2S$: S, 6.33; $N_{AP}$, 8.30. Found: S, 5.97; $N_{AP}$, 8.57.

Example 122

3 - [(2 - diethylaminoethyl)acetylamino]tropane [I;

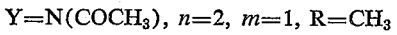

$N=B=N(C_2H_5)_2$].—A mixture of 22 g. of 3-(2-diethylaminoethylamino)tropane and 30 cc. of acetic anhydride was heated on a steam bath for two hours, kept for two days at room temperature, poured into ice-water, and the solution made basic and extracted. The extracts were concentrated and the residue distilled. The fraction boiling at 143–150° C. (0.05–0.15 mm.) (20.1 g.) was collected and redistilled, giving 3-[(2-diethylaminoethyl)-acetylamino]tropane, B. P. 142–144° C. (0.09 mm.), $n_D^{25}=1.4980$. A sample of the latter was converted to the picrate which was recrystallized from ethanol and had the M. P. 198–200° C.

Example 123

*3 - [(2 - diethylaminoethyl)ethylamino]tropane* [I;

$Y=N(C_2H_5)$, $n=2$, $m=1$, $R=CH_3$ $N=B=N(C_2H_5)_2$].—A solution of 10.3 g. of 3-[(2-diethylaminoethyl)acetylamino]tropane in 30 cc. of ether was added to a suspension of 4.0 g. of lithium aluminum hydride in about 30 cc. of ether at such a rate to maintain reflux over a period of twenty minutes. Water was then added to the reaction mixture, the organic layer separated and concentrated, and the residue distilled, giving 10 g. of 3-[(2-diethylaminoethyl)ethylamino]tropane, B. P. 142° C. (2 mm.), $n_D^{28}=1.4845$.

Example 124

*3-[(2-diethylaminoethyl)ethylamino]tropane bismethiodide.*—A solution of 0.47 g. of 3-[(2-diethylaminoethyl)ethylamino]tropane in 10 cc. of acetonitrile was treated with 0.5 cc. of methyl iodide. There was thus obtained 0.63 g. of 3-[(2-diethylaminoethyl)ethylamino]tropane bismethiodide, M. P. 230–231° C. (dec.).

*Analysis.*—Calcd. for $C_{18}H_{39}I_2N_3$: I, 46.0; N, 7.63. Found: I, 45.4; N, 7.74.

Example 125

*3 - [(2-diethylaminoethyl)ethylamino]tropane bisethiodide.*—A solution of 2.0 g. of 3-[(2-diethylaminoethyl)ethylamino]tropane in 20 ml. of acetonitrile was treated with 2.0 cc. of ethyl iodide. There was thus obtained 3.6 g. of 3-[(2-diethylaminoethyl)ethylamino]tropane bisethiodide, M. P. 226° C. (dec.).

*Analysis.*—Calcd. for $C_{20}H_{43}I_2N_3$: I, 43.8; N, 7.25. Found: I, 43.7; N, 7.46.

Example 126

*3 - [(2-diethylaminoethyl)propionylamino]tropane* [I;

$Y=N(COCH_2CH_3)$, $n=2$, $m=1$, $R=CH_3$ $N=B=N(C_2H_5)_2$].—3 - (2 - diethylaminoethylamino)-tropane (48 g.) was cooled to the temperature of solid carbon dioxide, 50 cc. of propionic anhydride was added and the mixture was allowed to warm to 70° C. The reaction mixture was worked up as described above in Example 122, giving 45.8 g. of 3-[(2-diethylaminoethyl)propionylamino]tropane, B. P. 160° C. (0.5 mm.), $n_D^{23}=1.4940$–5. A sample was converted to the picrate, M. P. 173–176° C. when recrystallized from aqueous dimethylformamide.

Example 127

*3 - [(2 - diethylaminoethyl)propylamino]tropane* [I; $Y=N(C_3H_7)$, $n=2$, $m=1$, $R=CH_3$, $N=B=N(C_2H_5)_2$]

A solution of 29.5 g. of 3-[(2-diethylaminoethyl)propionylamino]tropane in 100 cc. of ether was added to a suspension of 4.0 g. of lithium aluminum hydride in 100 ml. of dry ether at such a rate to maintain gentle reflux. The reaction mixture was stirred for one hour, 15 ml. of ethanol and 25 ml. of 20% sodium potassium tartrate solution were added, and the mixture was stirred for one and one-half hours. The mixture was filtered and the filtrate dried over potassium carbonate, concentrated, and the residue distilled, giving 23.6 g. of 3-[(2-diethylaminoethyl)propylamino]tropane, B. P. 119–126° C. (0.1 mm.), $n_D^{28}=1.4835$. A sample of the latter was converted to the picrate which had the M. P. 223° C. (dec.) when recrystallized first from aqueous dimethylformamide and then from a dimethylformamide-ethanol mixture.

Example 128

*3 - [(2 - diethylaminoethyl)propylamino]tropane bismethiodide.*—A solution of 2.0 g. of 3-[(2-diethylaminoethyl)propylamino]tropane in 30 cc. of acetonitrile was treated with 2 ml. of methyl iodide. There was thus obtained 2.0 g. of 3-[(2-diethylaminoethyl)propylamino]tropane bismethiodide, M. P. 203–209° C. (dec.).

*Analysis.*—Calcd. for $C_{19}H_{41}I_2N_3$: I, 44.9; N, 7.44. Found: I, 44.5; N, 7.56.

Example 129

*3 - [(2 - diethylaminoethyl)butyrylamino]tropane* [I; $Y=N(COCH_2CH_2CH_3)$, $n=2$, $m=1$, $R=CH_3$, $N=B=N(C_2H_5)_2$]

was prepared from 48 g. of 3-(2-diethylaminoethylamino)-tropane and 50 cc. of butyric anhydride according to the manipulative procedure described above in Example 126. There was thus obtained 50.5 g. of 3-[(2-diethylaminoethyl)butyrylamino]tropane, B. P. 162–166° C. (0.7 mm.), $n_D^{25}=1.4935$. A sample of the latter was converted to the picrate which had the M. P. 194–196° C. when recrystallized from aqueous dimethylformamide.

Example 130

*3-[(2-diethylaminoethyl)butylamino]tropane* [I;

$Y=N(C_4H_9)$ $n=2$, $m=1$, $R=CH_3$, $N=B=N(C_2H_5)_2$] was prepared from 30.9 g. of 3-[(2-diethylaminoethyl)butyrylamino]tropane and 4.0 g. of lithium aluminum hydride according to the manipulative procedure described above in Example 127. There was thus obtained 25.4 g. of 3-[(2-diethylaminoethyl)butylamino]tropane, B. P. 125–130° C. (0.1 mm.), $n_D^{28}=1.4839$. A sample of the latter was converted to the picrate which had the M. P. 208–210° C. (dec.) when recrystallized from a dimethylformamide-ethanol mixture.

Example 131

*3 - {[2 - (1 - pyrrolidyl)ethyl]formylamino}tropane* [I; $Y=N(COH)$, $n=2$, $m=1$, $R=CH_3$, $N=B=NC_4H_8$]. A mixture of 15.5 g. of 3-[2-(1-pyrrolidyl)ethylamino]-tropane and 10 cc. of formic acid was heated on a steam bath for about fifteen hours. The reaction mixture was poured into ice-water, made basic with 35% sodium hydroxide solution and extracted with benzene. The benzene solution was concentrated and the residue distilled. The fraction boiling at 133–154° C. (0.1 mm.) was collected and redistilled, giving 3-{[2-(1-pyrrolidyl)ethyl]formylamino}tropane, B. P. 166–172° C. (0.9 mm.), $n_D^{25}=1.5131$. A sample of the latter was converted to the picrate which had the M. P. 192–194° C. when recrystallized from aqueous dimethylformamide.

Example 132

*1 - (2 - diethylaminoethyl) - 1 - [3 - (8 - phenyl)nortropanyl] - 3 - phenylthiourea* [I; $Y=N(CSNHC_6H_5)$, $n=2$, $m=1$, $R=C_6H_5$, $N=B=N(C_2H_5)_2$] was prepared from 3 - (2-diethylaminoethylamino)-8-phenylnortropane (Example 98) and phenylisothiocyanate in methanol solution. The product which separated was recrystallized from ethanol, giving 1-(2-diethylaminoethyl)-1-[3-(8-phenyl)nortropanyl]-3-phenylthiourea, M. P. 161–163° C.

Example 133

*3 - [(2 - diethylaminoethyl)acetylamino] - 8 - phenylnortropane* [I; $Y=N(COCH_3)$, $n=2$, $m=1$, $R=C_6H_5$, $N=B=N(C_2H_5)_2$] was prepared from 15 g. of 3-(2-diethylaminoethylamino) - 8 - phenylnortropane (Example 98) and 20 ml. of acetic anhydride according to the manipulative procedure described above in Example 122. There was thus obtained 11.5 g. of 3-[(2-diethylaminoethyl)acetylamino]-8-phenylnortropane, B. P. 183–198° C. (0.2 mm.), $n_D^{25}=1.5470$.

Example 134

*3 - [(2 - diethylaminoethyl)ethylamino] - 8 - phenylnortropane* [I; $Y=N(C_2H_5)$, $n=2$, $m=1$, $R=C_6H_5$, $N=B=N(C_2H_5)_2$] was prepared from 10.0 g. of 3-[(2- diethylaminoethyl)acetylamino]-8-phenylnortropane and 4 g. of lithium aluminum hydride according to the manipulative procedure described above in Example 127. There was thus obtained 6 g. of 3-[(2-diethylaminoethyl)-ethylamino]-8-phenylnortropane, B. P. 180–184° C. (0.9 mm.), $n_D^{30}$=1.5370.

*Example 135*

3 - [(2 - phenylethylaminoethyl)formylamino]tropane [I; Y=N(CHO), n=2, m=1, R=CH₃,

N=B=N(C₂H₅)(C₆H₅)]

A mixture of 47 g. of 3-(2-phenylethylaminoethylamino)-tropane (Example 72) and 42 cc. of 98–100% formic acid was heated on a steam bath for thirty minutes. Toluene (100 ml.) was then added and the solution was refluxed for four hours. The reaction mixture was poured into ice and then made basic with 35% sodium hydroxide solution. The product was extracted with ether, the ether was removed, and the residue was dried azeotropically, giving 18.1 g. of 3-[(2-phenylethylaminoethyl)-formylamino]tropane, B. P. 200–207° C. (0.1–0.2 mm.).

*Example 136*

3 - [(2 - phenylethylaminoethyl)methylamino]tropane [I; Y=N(CH₃), n=2, m=1, R=CH₃,

N=B=N(C₂H₅)(C₆H₅)]

was prepared from 17.2 g. of 3-[(2-phenylethylaminoethyl)formylamino]tropane and 10 g. of lithium aluminum hydride in 200 ml. of ether according to the manipulative procedure described above in Example 123. The product distilling at 159–164° C. (0.5 mm.) was collected and redistilled, giving 3-[(2-phenylethylaminoethyl)methylamino]tropane, B. P. 182–187° C. (1.5 mm.), $n_D^{24}$=1.5518.

*Example 137*

3 - [(2 - phenylethylaminoethyl)methylamino]tropane bismethiodide.—A solution of 3.0 g. of 3-[(2-phenylethylaminoethyl)methylamino]tropane and 3.1 cc. of methyl iodide in 20 cc. of absolute alcohol was refluxed for one hour. An additional 10 cc. of absolute alcohol and 2 cc. of methyl iodide were added and the solution was refluxed for four hours longer. The crystalline product was collected by filtration, stirred with 100 ml. of hot absolute alcohol and again collected by filtration. The product was recrystallized from water and dried at 78° C. in vacuo for eight hours giving 3-[(2-phenylethylaminoethyl)methylamino]tropane bismethiodide, M. P. 240–242° C. (dec.).

*Analysis.*—Calcd. for C₂₁H₃₇N₃I₂: I, 43.36; N, 7.18. Found: I, 43.15; N, 7.22.

*Example 138*

3 - [2 - (p - tolyl)methylaminoethylamino]tropane [I; Y=NH, n=2, m=1, R=CH₃,

N=B=N(CH₃)(p-CH₃C₆H₄)]

was prepared from 125.1 g. of N-methyl-N-(p-tolyl)-ethylenediamine and 117 g. of 3-tropanone according to the manipulative procedure described above in Example 1. There was thus obtained a product boiling at 169–190° C. (0.2 mm.) which was redistilled to give 134 g. of 3-[2-(p-tolyl)methylaminoethylamino]tropane, B. P. 164–173° C. (0.3 mm.), $n_D^{23.5}$=1.5532.

*Analysis.*—Calcd. for C₁₈H₂₉N₃: N, 14.62. Found: N, 14.40.

*Example 139*

3 - {[2 - (p - tolyl)methylaminoethyl]formylamino}tropane [I; Y=N(CHO), n=2, m=1, R=CH₃, N=B=N(CH₃)(p-CH₃C₆H₄)]

was prepared from 60.2 g. of 3 - [2 - (p - tolyl)methyl- aminoethylamino]tropane, 33 cc. of 98% formic acid and 200 cc. of toluene according to the manipulative procedure described above in Example 135. There was obtained 24 g. of 3 - {[2 - (p - tolyl)methylaminoethyl]-formylamino}tropane, M. P. 95–97° C.

*Analysis.*—Calcd. for C₁₉H₂₉N₃O: N, 8.89. Found: N, 8.88.

*Example 140*

3 - {[2 - (p - tolyl)methylaminoethyl]methylamino}tropane [I; Y=N(CH₃), n=2, m=1, R=CH₃, N=B=N(CH₃)(p-CH₃C₆H₄)]

was prepared from 24 g. of 3 - {[2 - (p - tolyl)methylaminoethyl]formylamino}tropane and 5 g. of lithium aluminum hydride in 400 cc. of ether according to the manipulative procedure described above in Example 127. There was thus obtained 17.8 g. of 3 - {[2 - (p - tolyl)-methylaminoethyl]methylamino}tropane, B. P. 174–176° C. (0.5 mm.), $n_D^{24}$=1.5508–10; hydrochloride salt, M. P. 168° C.; picrate, M. P. 188° C. (dec.).

*Example 141*

3 - {[2 - (p - tolyl)methylaminoethyl]methylamino}tropane trismethiodide was prepared from 3.0 g. of the free base and 1.2 cc. of methyl iodide in 20 cc. of acetonitrile. There was obtained 3 g. of the trismethiodide, M. P. 215° C. (dec.).

*Analysis.*—Calcd. for C₂₂H₄₀I₃N₃: I, 52.3; N, 5.78. Found: I, 51.8; N, 5.86.

*Example 142*

1,7 - dimethyl - 4 - (3 - tropanyl) - 1,2,4,5 - tetrahydro - 1,4 - benzodiazepine [V; R'=CH₃, m=1, R=CH₃, R''=7—CH₃] was prepared from 28.7 g. of 3 - [2 - (p - tolyl)methylaminoethylamino]tropane, 25.9 ml. of 100% formic acid and 10 ml. of 37% formaldehyde according to the manipulative procedure described above in Example 70. There was thus obtained 19.3 g. of 1,7 - dimethyl - 4 - (3 - tropanyl) - 1,2,4,5 - tetrahydro - 1,4 - benzodiazepine, B. P. 163° C. (0.2 mm.). The picrate was obtained by dissolving the compound in absolute ethanol and adding alcoholic picric acid. The picrate was recrystallized from aqueous dimethylformamide and had the M. P. 230–231° C.

*Example 143*

1,7 - dimethyl - 4 - (3 - tropanyl) - 1,2,4,5 - tetrahydro - 1,4 - benzodiazepine methiodide was prepared from a solution of 17.2 g. of 1,7 - dimethyl - 4 - (3 - tropanyl) - 1,2,4,5 - tetrahydro - 1,4 - benzodiazepine and 18 g. of methyl iodide in 150 ml. of anhydrous methanol. The crystalline product which separated was leached twice with hot ethanol, and the undissolved material was recrystallized twice from ethanol, giving 1,7 - dimethyl - 4 - (3 - tropanyl) - 1,2,4,5 - tetrahydro - 1,4 - benzodiazepine methiodide, M. P. 274–276° C.

*Analysis.*—Calcd. for C₂₀H₃₂N₃I: N, 9.50; I, 28.8. Found: N, 9.34; I, 28.3.

*Example 144*

3 - [2 - (p - methoxyphenyl)methylaminoethylamino]-tropane [I; Y=NH, n=2, m=1, R=CH₃, N=B=N(CH₃)(p-CH₃OC₆H₄)]

was prepared from 63 g. of N-methyl-N-(p-methoxyphenyl)ethylenediamine and 53.9 g. of 3-tropanone according to the manipulative procedure described above in Example 1. There was thus obtained 61.7 g. of 3 - [2 - (p - methoxyphenyl)methylaminoethylamino]tropane, B. P. 179–183° C. (0.5 mm.), $n_D^{24}$=1.5560.

*Example 145*

3 - {[2 - (p - methoxyphenyl)methylaminoethyl]formylamino}tropane [I; Y=N(CHO), n=2, m=1, R=CH₃, N=B=N(CH₃)(p-CH₃OC₆H₄)] was prepared from 28 g. of 3 - [2 - (p - methoxyphenyl)methylaminoethylamino]tropane and 18 cc. of 98% formic acid according to the manipulative procedure described above in Example 135. There was obtained 13.6 g. of 3 - {[2 - (p - methoxyphenyl)methylaminoethyl]formylamino}tropane, M. P. 112–114° C.

*Analysis.*—Calcd. for $C_{19}H_{29}N_3O$: N, 8.47. Found: N, 8.34.

Example 146

*3 - {[2 - (p - methoxyphenyl)methylaminoethyl]methylamino}tropane* [I; Y=N(CH₃), n=2, m=1, R=CH₃, N=B=N(CH₃)(p-CH₃OC₆H₄)] was prepared from 13.3 g. of 3 - {[2 - (p - methoxyphenyl)methylaminoethyl]formylamino}tropane and 4.0 g. of lithium aluminum hydride in 750 cc. of ether according to the manipulative procedure described above in Example 127. There was thus obtained 6.0 g. of 3 - {[2 - (p - methoxyphenyl)methylaminoethyl]methylamino}tropane, B. P. 162–166° C. (0.1 mm.), $n_D^{25}$=1.5518; picrate, M. P. 205–207° C. (dec.).

*Analysis.*—Calcd. for $C_{19}H_{31}N_3O$: N, 13.24. Found: N, 13.04.

Example 147

*3 - {[2 - (p - methoxyphenyl)methylaminoethyl]methylamino}tropane bismethiodide* was prepared from 2.1 g. of the free base and 0.4 cc. of methyl iodide in 20 cc. of acetonitrile. There was obtained 1.8 g. of the bismethiodide, M. P. 195–198° C. when recrystallized from methanol.

*Analysis.*—Calcd. for $C_{21}H_{37}I_2N_3O$: I, 42.2; N, 6.98. Found: I, 41.8; N, 7.03.

Example 148

*1 - methyl - 4 - (3 - tropanyl) - 7 - methoxy - 1,2,4,5 - tetrahydro - 1,4 - benzodiazepine* [V; R'=CH₃, m=1, R=CH₃, R''=7—CH₃O] was prepared from 30.3 g. of 3 - [2 - (p - methoxyphenyl)methylaminoethylamino]tropane, 25.9 ml. of 100% formic acid and 10 ml. of 37% formaldehyde according to the manipulative procedure described above in Example 70. There was thus obtained 25 g. of product, B. P. 183–196° C. (0.1–0.5 mm.) which was redistilled, giving 19.3 g. of 1 - methyl - 4 - (3 - tropanyl) - 7 - methoxy - 1,2,4,5 - tetrahydro - 1,4 - benzodiazepine, B. P. 180–185° C. (0.1 mm.). The picrate had the M. P. 239–240° C. when recrystallized from aqueous dimethylformamide.

8 - (2 - chlorobenzyl)nortropanone (Example 93(*a*)) reacts with 2 - phenylethylaminoethylamine according to the manipulative procedure described above in Example 1 to give 3 - (2 - phenylethylaminoethylamino) - 8 - (2 - chlorobenzyl)nortropane [I; Y=NH, n=2, m=1, R=2—ClC₆H₄CH₂, N=B=N(C₂H₅)(C₆H₅)]. The latter can be reacted with formic acid and formaldehyde according to the manipulative procedure of Example 70 to give 1 - ethyl - 4 - [8 - (2 - chlorobenzyl) - 3 - nortropanyl] - 1,2,4,5 - tetrahydro - 1,4 - benzodiazepine [V; R'=C₂H₅, m=1, R=2—ClC₆H₄CH₂, R''=H].

Example 149

*3 - (2 - phenylmethylaminoethylamino) - 9 - methylgranatanine* [I; Y=NH, n=2, m=2, R=CH₃,

N=B=N(C₂H₅)(C₆H₅)]

A mixture of 35 g. of 2 - phenylethylaminoethylamine, 32 g. of pseudopelletierine, 1 g. of zinc chloride and 200 ml. of toluene was refluxed for about fifteen hours using a water separator to collect the water formed in the reaction. The reaction mixture was cooled, washed with 150 cc. of 10% sodium hydroxide solution and extracted with ether. The ether extracts were washed with 40% ammonium sulfate solution, dried over anhydrous potassium carbonate and concentrated. Absolute alcohol was added to the residue and the solution was again concentrated to dryness in vacuo. The residue (69 g.) containing 3 - (2 - phenylethylaminoethylamino) - 9 - methylgranatanine was dissolved in 200 ml. of absolute alcohol and hydrogenated in the presence of 1 g. of platinum oxide catalyst at an initial pressure of 50 lbs. per sq. inch. After reduction was complete, the catalyst was removed by filtration, the filtrate was concentrated and the residue distilled in vacuo, giving 43.4 g. of product which was redistilled, giving 37.7 g. of 3 - (2 - phenylmethylaminoethylamino) - 9 - methylgranatanine, B. P. 160–184° C. (0.2–0.9 mm.), $n_D^{30}$=1.5575.

3 - (2 - phenylmethylaminoethylamino) - 9 - methylgranatanine when heated with formaldehyde and formic acid gives 1 - ethyl - 4 - (9 - methyl - 3 - granatanyl) - 1,2,4,5 - tetrahydro - 1,4 - benzodiazepine [V; R'=CH₃, m=2, R=CH₃, R''=H].

Example 150

*3 - [(2 - phenylethylaminoethyl)formylamino] - 9-methylgranatanine* [I; Y=N(CHO), n=2, m=2, R=CH₃, N=B=N(C₂H₅)(C₆H₅)] was prepared from 15.0 g. of 3-(2-phenylethylaminoethylamino)-9-methylgranatanine, 12.5 cc. of 98% formic acid and 100 cc. of toluene according to the manipulative procedure described above in Example 135. There was thus obtained 13.0 g. of 3-[(2-phenylethylaminoethyl)formylamino]-9-methylgranatanine, B. P. 190–220° C. (0.07 mm.).

Example 151

*3 - [(2 - phenylethylaminoethyl)methylamino] - 9-methylgranatanine* [I; Y=N(CH₃), n=2, m=2, R=CH₃, N=B=N(C₂H₅)(C₆H₅)] was prepared from 12.5 g. of 3 - [(2 - phenylethylaminoethyl)formylamino] - 9-methylgranatanine and 4.0 g. of lithium aluminum hydride in 200 ml. of ether according to the manipulative procedure described above in Example 127. There was thus obtained 8.2 g. of 3-[(2-phenylethylaminoethyl)methylamino]-9-methylgranatanine, B. P. 161–166° C. (0.15 mm.). The picrate had the M. P. 191–194° C. (dec.) when recrystallized from aqueous dimethylformamide.

Example 152

*3 - [(2 - phenylethylaminoethyl)methylamino] - 9-methylgranatanine bismethiodide* was prepared from a solution of 3.2 g. of 3-[(2-phenylethylaminoethyl)methylamino]-9-methylgranatanine and 3 ml. of methyl iodide in 30 ml. of absolute alcohol. The crystalline product which separated was leached with hot absolute alcohol and the insoluble portion was recrystallized from water. There was thus obtained 3-[(2-phenylethylaminoethyl)methylamino]-9-methylgranatanine bismethiodide, M. P. 225–227° C. (dec.).

*Analysis.*—Calcd. for $C_{22}H_{39}N_3I_2$: I, 42.35. Found: I, 41.8.

Example 153

*3 - [(2 - phenylethylaminoethyl)acetylamino] - 9-methylgranatanine* [I;Y=N(COCH₃), n=2, m=2, R=CH₃, N=B=N(C₂H₅)(C₆H₅)] was prepared from 3-(2 - phenylethylaminoethylamino) - 9 - methylgranatanine and 30 ml. of acetic anhydride according to the manipulative procedure described above in Example 122. There was thus obtained 13.4 g. of 3-[(2-phenylethylaminoethyl)acetylamino]-9-methylgranatanine, B. P. 200–214° C. (0.2 mm.).

Example 154

*3 - [(2 - phenylethylaminoethyl)ethylamino] - 9 - methylgranatanine* [I; Y=N(C₂H₅), n=2, m=2, R=CH₃, N=B=N(C₂H₅)(C₆H₅)] was prepared from 13.4 g. of 3-[(2-phenylethylaminoethyl)acetylamino]-9-methylgranatanine and 4.0 g. of lithium aluminum hydride in 200 ml. of ether according to the manipulative procedure described above in Example 127. There was thus obtained 7.6 g. of 3-[(2-phenylethylaminoethyl)ethylamino]-9-methylgranatanine, B. P. 162–167° C. (0.1 mm.). The picrate had the M. P. 203–205° C. (dec.) when recrystallized from aqueous dimethylformamide.

Example 155

3 - [2 - (1 - pyrrolidyl)ethylamino] - 8 - (2 - chlorobenzyl)nortropane [I; Y=NH, n=2, m=1, R=2—ClC₆H₅CH₂

N=B=NC₄H₈] was prepared from 8-(2-chlorobenzyl)-nortropanone (obtained by neutralization of 21.4 g. of its hydrochloride salt), 11.6 g. of 2-(1-pyrrolidyl)ethylamine and 0.75 g. of platinum oxide catalyst according to the manipulative procedure described above in Example 1. The crude product was dissolved in 100 cc. of ethanol, made acid to pH 3 with alcoholic hydrogen chloride, and the crystalline product was collected by filtration, giving 25.8 g. of 3-[2-(1-pyrrolidyl)ethylamino]-8-(2-chlorobenzyl)nortropane trihydrochloride, M. P. 253° C. (dec.) when recrystallized twice from ethanol.

Analysis.—Calcd. for C₂₀H₃₀N₃Cl.3HCl: Cl, 31.02; N, 9.19. Found: Cl, 30.48; N, 9.07.

Example 156

3 - [2 - (1 - pyrrolidyl)ethylamino] - 8 - (2 - chlorobenzyl)nortropane bismethiodide.—A solution of 3-[2-(1-pyrrolidyl)ethylamino] - 8 - (2 - chlorobenzyl)nortropane (obtained by neutralization of 5 g. of its trihydrochloride salt) in 25 ml. of ethanol was treated with 3 ml. of methyl iodide, and the solution was heated for two hours. The crystalline material which separated upon cooling was collected by filtration and recrystallized twice from methanol, giving 3-[2-(1-pyrrolidyl)ethylamino]-8-(2-chlorobenzyl)nortropane bismethiodide, M. P. 218–220° C. (dec.).

Analysis.—Calcd. for C₂₂H₃₆ClI₂N₃: I, 40.2. Found: I, 39.9.

Example 157

3 - [(2 - phenylmethylaminoethyl)formylamino]tropane [I; Y=N(CHO), n=2, m=1, R=CH₃, N=B=N(CH₃)(C₆H₅)] was prepared from 44 g. of 3-(2-phenylmethyl-aminoethylamino)tropane (Example 69) and 44.5 cc. of 98% formic acid according to the manipulative procedure described above in Example 135. There was obtained 24.4 g. of 3-[(2-phenylmethylaminoethyl)formylamino]tropane, B. P. 216–222° C. (0.5 mm.).

Example 158

3- [(2 - phenylmethylaminoethyl)methylamino]tropane [I; Y=N(CH₃), n=2, m=1, R=CH₃, N=B=N(CH₃)(C₆H₅)] was prepared from 24.4 g. of 3-[(2-phenyl-methylaminoethyl)formylamino]tropane and 10 g. of lithium aluminum hydride in 450 cc. of ether according to the manipulative procedure described above in Example 127. There was thus obtained 17.6 g. of 3-[(2-phenylmethylaminoethyl)methylamino]tropane, B. P. 160–165° C. (0.6 mm.).

The bismethiodide of 3-[(2-phenylmethylaminoethyl)-methylamino]tropane was prepared and had the M. P. 255° C. (dec.).

Analysis.—Calcd. for C₂₀H₃₅N₃I₂: I, 44.4; N, 7.36. Found: I, 44.0; N, 7.40.

The bismethobromide of 3-[(2-phenylmethylaminoethyl)methylamino]tropane was prepared and had the M. P. 258° C. (dec.).

Analysis.—Calcd. for C₂₀H₃₅N₃Br₂: Br, 33.5. Found: Br, 34.5.

Example 159

(a) 8-(2,4-dichlorobenzyl)nortropane was prepared from 68 g. of 2,5-diethoxytetrahydrofuran, 80 g. of ethyl acetodicarboxylate and 89 g. of 2,4-dichlorobenzylamine according to the manipulative procedure described above in Example 79, part a. There was thus obtained 8-(2,4-dichlorobenzyl)nortropane, B. P. 185–187° C. (1.5 mm.); hydrochloride salt, M. P. 216° C. (dec.).

(b) 3 - (2 - diethylaminoethylamino) - 8 - (2,4 - dichlorobenzyl)nortropane [I; Y=NH, n=2, m=1, R=2,4—Cl₂C₆H₃CH₂, N=B=N(C₂H₅)₂] was prepared from 8-(2,4-dichlorobenzyl)nortropane (obtained by neutralization of 11.5 g. of its hydrochloride salt), 4.1 g. of 2-diethylaminoethylamine and 0.75 g. of platinum oxide catalyst according to the manipulative procedure described above in Example 1. The 3-(2-diethylaminoethylamino)-8-(2,4-dichlorobenzyl)nortropane thus obtained was converted to its hydrochloride salt by treating it with an excess of alcoholic hydrogen chloride. The hydrochloride salt weighed 9.5 g.

Example 160

3-(2-diethylaminoethylamino)-8 - (2,4-dichlorobenzyl)-nortropane bismethiodide was obtained from the free base (prepared by neutralization of 7 g. of its hydrochloride salt) and 5 cc. of methyl iodide in 50 cc. of ethanol, refluxed for five hours. The bismethiodide thus obtained had the M. P. 237–239° C. when recrystallized from methanol.

This application is a continuation-in-part of my co-pending application, Serial No. 451,963, filed August 24, 1954, which is in turn a continuation-in-part of my co-pending application, Serial No. 380,884, filed September 17, 1953, now abandoned.

I claim:

1. A compound selected from the group consisting of (a) N-[3-(N-substituted 1,5-imino-bridged cycloalkyl)]-N'-tertiary-amino-lower-alkylenediamines, wherein the cycloalkyl radical is a member of the group consisting of cycloheptane and cyclooctane, and the tertiary-amino group is a member of the group consisting of di-lower-alkylamino, 1-piperidyl, 1-pyrrolidyl, 4-morpholinyl, and monocarbocyclic aryl-lower-alkyl-amino radicals wherein monocarbocyclic aryl is selected from the group consisting of phenyl and phenyl substituted by from one to three substituents selected from the group consisting of lower-alkyl, lower-alkoxy and halogen radicals, (b) acid-addition salts thereof, and (c) quaternary ammonium salts thereof, said salts having anions which do not substantially increase the toxicity of the compound as a whole to animal organisms.

2. A quaternary ammonium salt of the amine having the formula:

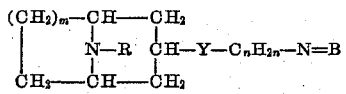

wherein n is an integer from 2 to 6, m is 1, N=B is a di-lower-alkyl-amino radical, R is a lower-alkyl group, Y is an N(lower-alkyl) group, and the radicals N=B and Y are attached to different carbon atoms of $C_nH_{2n}$, said salt having an anion which does not substantially increase the toxicity of the compound as a whole to animal organisms.

3. A quaternary ammonium salt of an amine having the formula:

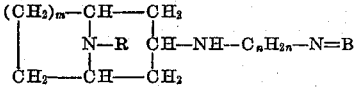

wherein n is an integer from 2 to 6, m is 1, N=B is a di-lower-alkyl-amino radical, R is a lower-alkyl group, and the radicals N=B and NH are attached to different carbon atoms of $C_nH_{2n}$, said salt having an anion which does not substantially increase the toxicity of the compound as a whole to animal organisms.

4. A quaternary ammonium salt of an amine having the formula:

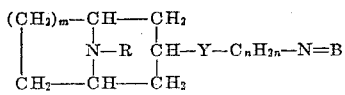

wherein $n$ is an integer from 2 to 6, $m$ is 1, N=B is a phenyl-lower-alkylamino radical, R is a lower-alkyl group, Y is an N(lower-alkyl) group, and the radicals N=B and Y are attached to different carbon atom of $C_nH_{2n}$, said salt having an anion which does not substantially increase the toxicity of the compound as a whole to animal organisms.

5. A quaternary ammonium salt of an amine having the formula:

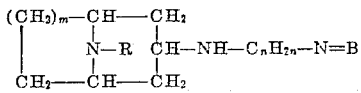

wherein $n$ is an integer from 2 to 6, $m$ is 1, N=B is a di-lower-alkylamino radical, R is the 2-chlorobenzyl group, and the radicals N=B and NH are attached to different carbon atoms of $C_nH_{2n}$, said salt having an anion which does not substantially increase the toxicity of the compound as a whole to animal organisms.

6. A quaternary ammonium salt of 3-[(2-diethylaminoethyl)methylamino]tropane, said salt having an anion which does not substantially increase the toxicity of the compound as a whole to animal organisms.

7. A quaternary ammonium salt of 3-(2-diethylaminoethylamino)tropane, said salt having an anion which does not substantially increase the toxicity of the compound as a whole to animal organisms.

8. A quaternary ammonium salt of 3-[2-(1-pyrrolidyl)-ethylamino]-9-methylgranatanine, said salt having an anion which does not substantially increase the toxicity of the compound as a whole to animal organisms.

9. A quaternary ammonium salt of 3-[(2-ethylphenyl-aminoethyl)methylamino]tropane, said salt having an anion which does not substantially increase the toxicity of the compound as a whole to animal organisms.

10. A quaternary ammonium salt of 3-(2-diethylaminoethylamino)-8-(2-chlorobenzyl)nortropane, said salt having an anion which does not substantially increase the toxicity of the compound as a whole to animal organisms.

11. The process for preparing a quaternary ammonium salt of an N-[3-(N-substituted 1,5-imino-bridged cycloalkyl)]-N'-tertiary-amino-lower-alkylamine, wherein the cycloalkyl radical is a member of the group consisting of cycloheptane and cyclooctane, and the tertiary-amino group is a member of the group consisting of di-lower-alkylamino, 1-piperidyl, 1-pyrrolidyl, 4-morpholinyl, and monocarbocyclic aryl-lower-alkylamino radicals wherein monocarbocyclic aryl is selected from the group consisting of phenyl and phenyl substituted by from one to three substituents selected from the group consisting of lower-alkyl, lower-alkoxy and halogen radicals, said salt having an anion which does not substantially increase the toxicity of the compound as a whole to animal organisms, which comprises reacting said N-[3-(N-substituted 1,5-imino-bridged cycloalkyl)]-N'-tertiary-amino-lower-alkyl-amine with a compound of the formula R'''X'' wherein R''' is a hydrocarbon radical and X'' is the anion of a strong acid.

12. The process for preparing a quaternary ammonium salt of an amine having the formula

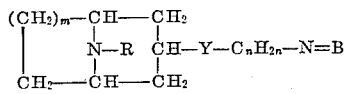

wherein $C_nH_{2n}$ is an alkylene radical of 2–6 carbon atoms, $m$ is 1, N=B is a di-lower-alkylamino radical, R is a lower-alkyl group, Y is an N(lower-alkyl) group, and the radicals N=B and Y are attached to different carbon atoms of $C_nH_{2n}$, said salt having an anion which does not substantially increase the toxicity of the compound as a whole to animal organisms, which comprises reacting said amine with a compound of the formula R'''X'' wherein R''' is a hydrocarbon radical and X'' is the anion of a strong acid, which anion does not substantially increase the toxicity of the compound as a whole to animal organisms.

13. The process for preparing a quaternary ammonium salt of an amine having the formula

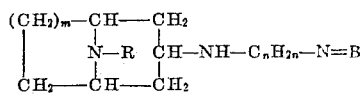

wherein $C_nH_{2n}$ is an alkylene radical of 2–6 carbon atoms, $m$ is 1, N=B is a di-lower-alkylamino radical, R is a lower-alkyl group, and the radicals N=B and NH are attached to different carbon atoms of $C_nH_{2n}$, said salt having an anion which does not substantially increase the toxicity of the compound as a whole to animal organisms, which comprises reacting said amine with a compound of the formula R'''X'' wherein R''' is a hydrocarbon radical and X'' is the anion of a strong acid, which anion does not substantially increase the toxicity of the compound as a whole to animal organisms.

14. The process for preparing a quaternary ammonium salt of an amine having the formula

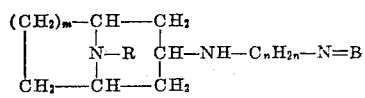

wherein $C_nH_{2n}$ is an alkylene radical of 2–6 carbon atoms, $m$ is 1, N=B is a di-lower-alkylamino radical, R is the 2-chlorobenzyl group, and the radicals N=B and NH are attached to different carbon atoms of $C_nH_{2n}$, said salt having an anion which does not substantially increase the toxicity of the compound as a whole to animal organisms, which comprises reacting said amine with a compound of the formula R'''X'' wherein R''' is a hydrocarbon radical and X'' is the anion of a strong acid, which anion does not substantially increase the toxicity of the compound as a whole to animal organisms.

15. The process for preparing a quaternary ammonium salt of 3-[(2-diethylaminoethyl)methylamino]tropane, said salt having an anion which does not substantially increase the toxicity of the compound as a whole to animal organisms, which comprises reacting said 3-[(2-diethylaminoethyl)methylamino]tropane with a compound of the formula R'''X'' wherein R''' is a hydrocarbon radical and X'' is the anion of a strong acid, which anion does not substantially increase the toxicity of the compound as a whole to animal organisms.

16. The process for preparing a quaternary ammonium salt of 3-(2-diethylaminoethylamino)tropane, said salt having an anion which does not substantially increase the toxicity of the compound as a whole to animal organisms, which comprises reacting said 3-(2-diethylaminoethylamino)tropane with a compound of the formula R'''X'' wherein R''' is a hydrocarbon radical and X'' is the anion of a strong acid, which anion does not substantially increase the toxicity of the compound as a whole to animal organisms.

17. The process for preparing a quaternary ammonium salt of 3-[2-(1-pyrrolidyl)ethylamino]-9-methylgranatanine, said salt having an anion which does not substantially increase the toxicity of the compound as a whole to animal organisms, which comprises reacting said 3-[2-(1-pyrrolidyl)ethylamino]-9-methylgranatanine with a compound of the formula R'''X'' wherein R''' is a hydrocarbon radical and X'' is the anion of a strong acid.

18. The process for preparing a quaternary ammonium salt of 3-[(2-ethylphenylaminoethyl)methylamino]tropane, said salt having an anion which does not substantially increase the toxicity of the compound as a whole to animal organisms, which comprises reacting said 3-[(2-ethylphenylaminoethyl)methylamino]tropane with a compound of the formula R'''X'' wherein R''' is a hydrocarbon radical and X'' is the anion of a strong acid, which anion does not substantially increase the toxicity of the compound as a whole to animal organisms.

19. The process for preparing a quaternary ammonium salt of 3-(2-diethylaminoethylamino)-8-(2-chlorobenzyl)-nortropane, said salt having an anion which does not substantially increase the toxicity of the compound as a whole to animal organisms, which comprises reacting said 3-(2-diethylaminoethylamino) - 8-(2-chlorobenzyl)-nortropane with a compound of the formula R'''X'' wherein R''' is a hydrocarbon radical and X'' is the anion of a strong acid, which anion does not substantially increase the toxicity of the compound as a whole to animal organisms.

References Cited in the file of this patent

UNITED STATES PATENTS

| | | |
|---|---|---|
| 2,595,405 | Phillips | May 6, 1952 |
| 2,678,317 | Payne et al. | May 11, 1954 |

UNITED STATES PATENT OFFICE
Certificate of Correction

Patent No. 2,845,427                                 July 29, 1958

Sydney Archer

It is hereby certified that error appears in the printed specification of the above numbered patent requiring correction and that the said Letters Patent should read as corrected below.

Column 2, line 44, for "di-loweral-alkylamino" read *di-lower-alkylamino*; column 6, line 62, for "$(CH_3)_2NHC_2CH_2CH_2Br$" read *$(CH_3)_2NCH_2CH_2CH_2Br$*; column 10, line 30, for "35%" read *36%*; column 12, line 20, for "piperidyl)methyl]methylamino}tropane" read *piperidyl)ethyl]methylamino}tropane*; column 18, line 33, for "*3-(3-diethylaminopropyoxy)tropane*" read *3-(3-diethylaminopropoxy)tropane*; column 19, line 66, for "B. P. 97–99° C." read [*B. P. 97–99° C.*; column 21, line 9, for "hydrochloride acid" read *hydrochloric acid*; column 26, line 65, for "Y=N(CSNHC$_6$H$_5$" read *Y=N(CSNHC$_6$H$_5$)* column 27, line 26, for "S, 8.46" read *S, 8.56*; column 36, line 4, for "3-(2-phenylethylaminoethylamino)" read *3-(2-phenylethylaminoethylimino)*; column 38, line 1, for "acetodicarboxylate" read *acetondicarboxylate*; column 39, line 10, for "atom" read *atoms*.

Signed and sealed this 3rd day of March 1959.

[SEAL]

Attest:
KARL H. AXLINE,
*Attesting Officer.*

ROBERT C. WATSON,
*Commissioner of Patents.*